United States Patent
Wigren

(10) Patent No.: US 8,654,010 B2
(45) Date of Patent: Feb. 18, 2014

(54) DETERMINING POSITIONING OF WIRELESS TERMINAL IN TELECOMMUNICATIONS NETWORK

(75) Inventor: Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 461 days.

(21) Appl. No.: 12/595,317

(22) PCT Filed: Apr. 12, 2007

(86) PCT No.: PCT/SE2007/050242
§ 371 (c)(1),
(2), (4) Date: Oct. 9, 2009

(87) PCT Pub. No.: WO2008/127161
PCT Pub. Date: Oct. 23, 2008

(65) Prior Publication Data
US 2010/0117898 A1   May 13, 2010

(51) Int. Cl.
*G01S 1/24* (2006.01)
(52) U.S. Cl.
USPC .......................................................... 342/387
(58) Field of Classification Search
USPC ......... 342/463–464, 357.2–357.78, 450, 458, 342/386–387, 465, 366; 370/338; 455/456.1
See application file for complete search history.

(56) References Cited

U.S. PATENT DOCUMENTS

| | | | |
|---|---|---|---|
| 5,999,124 A | 12/1999 | Sheynblat | |
| 7,274,299 B2 * | 9/2007 | Osman | 340/686.1 |
| 7,715,849 B2 * | 5/2010 | Spirito et al. | 455/456.1 |
| 2002/0115459 A1 * | 8/2002 | Chuang et al. | 455/522 |
| 2002/0171586 A1 * | 11/2002 | Martorana et al. | 342/458 |
| 2004/0219930 A1 * | 11/2004 | Lin | 455/456.1 |
| 2006/0063536 A1 | 3/2006 | Kim et al. | |
| 2007/0037586 A1 | 2/2007 | Kim et al. | |
| 2007/0096981 A1 * | 5/2007 | Abraham | 342/357.15 |
| 2007/0121560 A1 * | 5/2007 | Edge | 370/338 |

FOREIGN PATENT DOCUMENTS

| | | |
|---|---|---|
| EP | 1 773 076 | 4/2007 |
| WO | 2007/043915 A1 | 4/2007 |

OTHER PUBLICATIONS

International Search Report for PCT/SE2007/050242, mailed Feb. 8, 2008.

(Continued)

*Primary Examiner* — Harry Liu
(74) *Attorney, Agent, or Firm* — Nixon & Vanderhye, P.C.

(57) ABSTRACT

In one of its aspects the technology concerns a method of determining a position of a wireless terminal in a radio access network using information of the travel time of radio waves between a base station and the wireless terminal, the travel time information being retrieved in a way consistent with SUPL positioning. The method comprises performing, at the wireless terminal, a time of arrival measurement for a respective downlink radio frame received from a node associated with a cell of a radio access network. The method thereafter uses the time of arrival measurement and an estimated time of downlink transmission from the node to make a determination of a distance between the wireless terminal and the node. The distance so determined can be used to generate an ellipsoid arc for describing a round trip time positioning of the wireless terminal. As an optional enhancement, the method further includes generating a thickness dimension of the ellipsoid arc, the thickness dimension of the ellipsoid arc reflecting clock uncertainty.

21 Claims, 13 Drawing Sheets

(56) References Cited

OTHER PUBLICATIONS

Written Opinion of the International Searching Authority for PCT/SE2007/050242, mailed Aug. 6, 2009.
OMA: "Secure User Plane Location Architecture", Draft Version 3.0; Open Mobile Alliance, (Feb. 9, 2007); pp. 14-26.
A. Kangas et al, "Location coverage and sensitivity with A-GPS", URSI EMP-S, Pisa, Italy, May 2004.
3GPP, TS 23.032, "Universal Geographical Area Description (GAD)", V7.0.0 (Jun. 2006).
3GPP, TS25.413, "UTRAN Iu interface RANAP signalling", V6.13.0 (Mar. 2007).
3GPP TS 25.453, 'UTRAN Iupc interface Position Calculation Application Part (PCAP) signalling', V7.6.0 (Mar. 2007).
Chinese Office Action issued in Application No. 200780053321.6 dated Nov. 5, 2012 with English Translation.

* cited by examiner

| 8 | 7 | 6 | 5 | 4 | 3 | 2 | 1 | |
|---|---|---|---|---|---|---|---|---|
| 0 | 1 | 0 | 1 | Number of points | | | | Octet 1 |
| S1 | | | | | | | | Octet 2 |
| Degrees of latitude of point 1 | | | | | | | | Octet 3 |
| | | | | | | | | Octet 4 |
| | | | | | | | | Octet 5 |
| Degrees of longitude of point 1 | | | | | | | | Octet 6 |
| | | | | | | | | Octet 7 |
| Sn | | | | | | | | Octet 6n-4 |
| Degrees of latitude of point n | | | | | | | | Octet 6n-3 |
| | | | | | | | | Octet 6n-2 |
| | | | | | | | | Octet 6n-1 |
| Degrees of longitude of point n | | | | | | | | Octet 6n |
| | | | | | | | | Octet 6n+1 |

PRIOR ART

*Fig. 2*

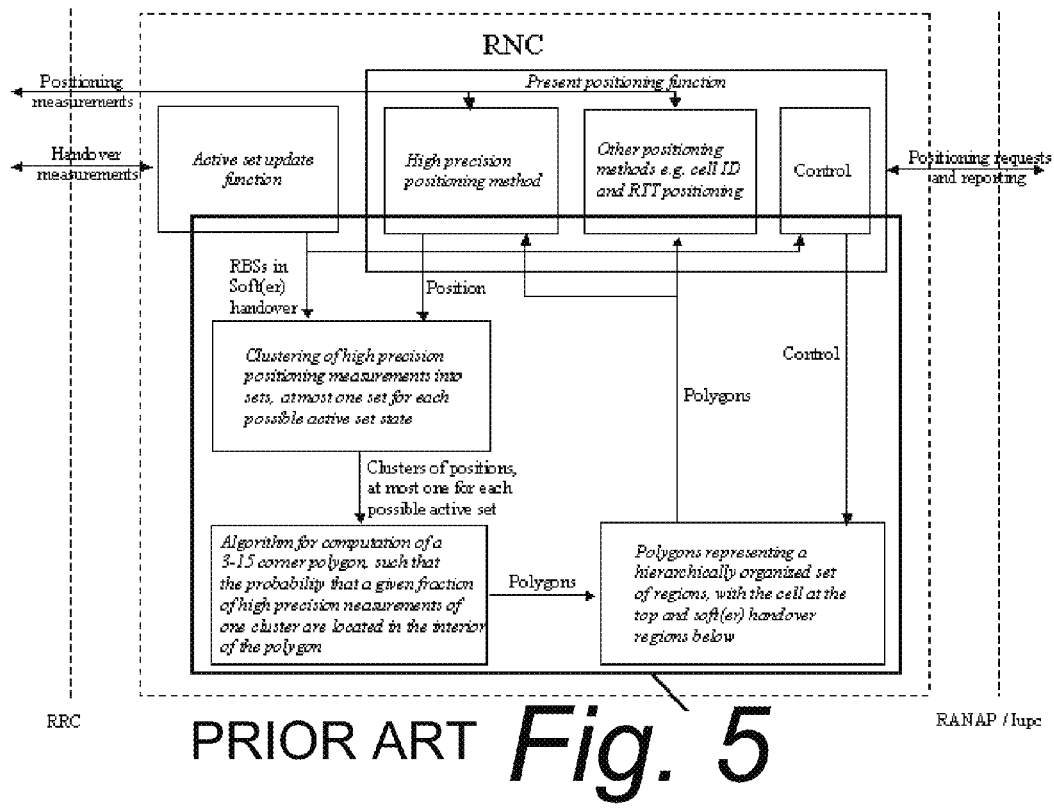
PRIOR ART Fig. 5
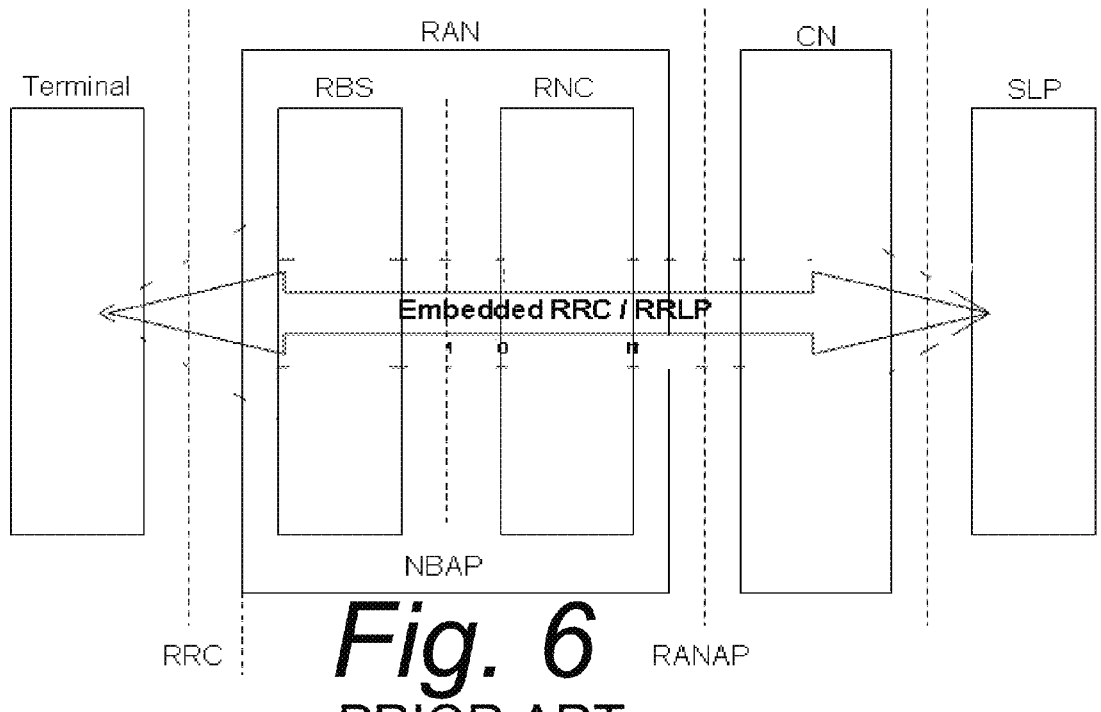
Fig. 6
PRIOR ART

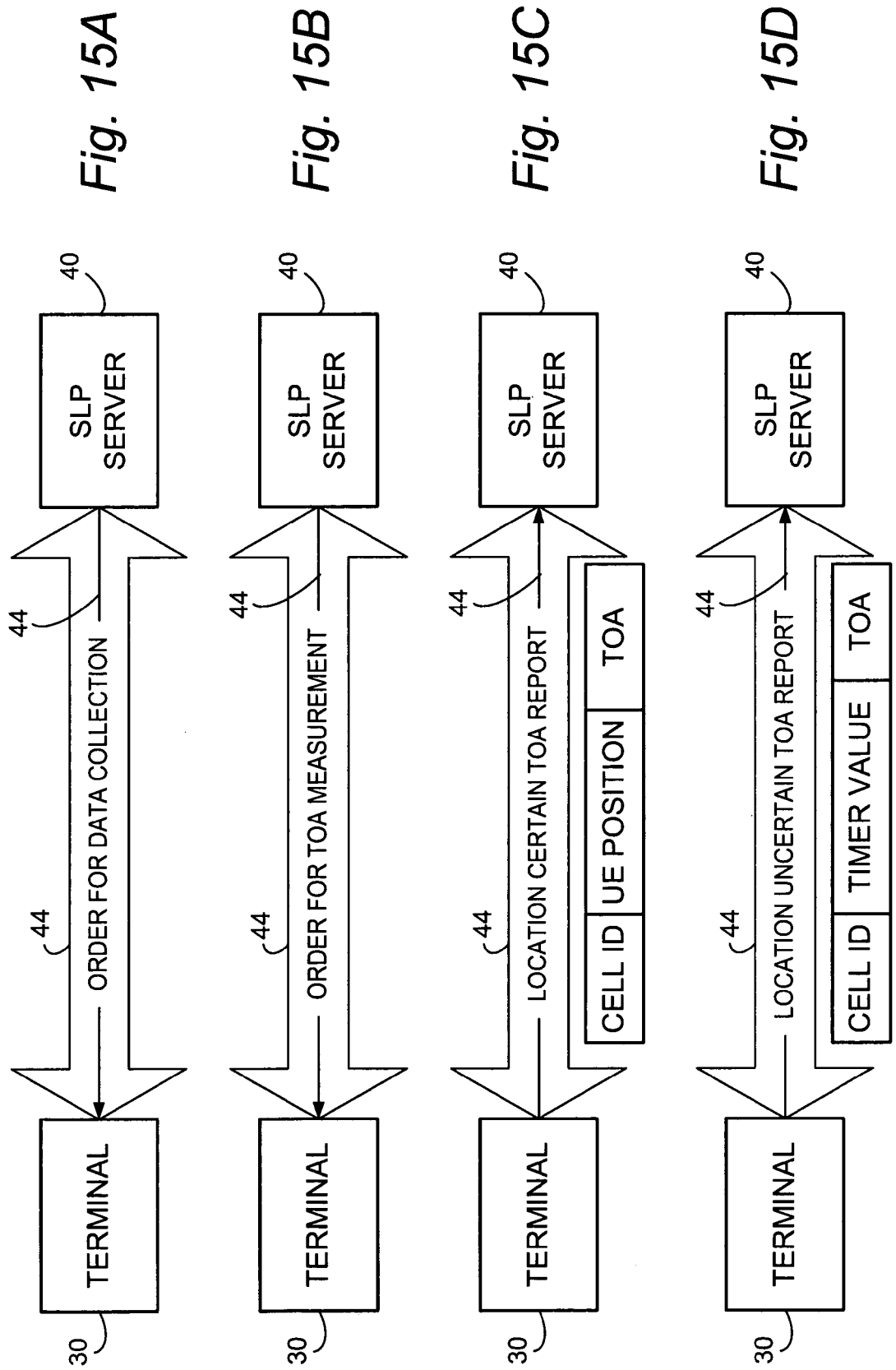

DETERMINING POSITIONING OF WIRELESS TERMINAL IN TELECOMMUNICATIONS NETWORK

This application is the U.S. national phase of international Application No. PCT/SE2007/050242 filed 12 Apr. 2007; the entire contents of which is hereby incorporated by reference.

BACKGROUND

I. Technical Field

This invention pertains to the field of cellular telecommunications, and particularly to methods and apparatus for locating a wireless terminal in a cellular telecommunications network.

II. Related Art and Other Considerations

1.0 Positioning for Telecommunications

It is often advantageous, and in some cases necessary, to know the geographical location of a wireless terminal, such as a cell phone (for example). For this reason, positioning services (typically provided by cellular telephony operators) are currently emerging in many markets.

In the North-American market, an initial impetus for knowing the geographical location of a wireless terminal arose from U.S. Federal Communications Commission requirements for emergency (E-911) positioning, i.e., techniques for location of cellular subscribers in emergency situations. These requirements specify a maximum location time (30 seconds) and certain required accuracies of the positioning technology, e.g., specified for the 67% and 95% percentiles. The regulations require within 50 m accuracy (for the 67% percentile) and within 150 m accuracy (for 95% percentile) for so-called handset based technology, of which GPS is one example. On the other hand, network based technology is allowed accuracy within 100 m (for the 67% percentile) and 300 m (for the 95% percentile). It can be noted that the percentile figures implicitly also specify a minimal availability of the service of 95%.

As will be discussed below, a good technology for meeting the accuracy requirements for E-911 services is provided by the US Global Position System GPS). GPS is a satellite navigation system deployed by the US Department of Defense. The performance of GPS is normally enhanced by techniques for assisted GPS (A-GPS) which are discussed below. A less discussed disadvantage of A-GPS is the low signal strength of the GPS ranging signals at ground level (caused by the distance to the orbiting satellites). As a result, GPS and A-GPS have far too low availability indoors and in extreme urban canyon areas. There is consequently a strong need for fallback positioning methods for E-911 services.

Moreover, not all handsets are equipped with GPS receivers. In such situations there is hence a need for alternative positioning methods beyond or supplementary to those of GPS.

Alternative positioning methods are also needed for other reasons, in particular when commercial location services are considered. In such situations the application or service may put requirements other than high accuracy on the location technology. A typical example of this is "where is the nearest . . . " type services. In order to use such a service, searching e.g. for a list of restaurants is not critically dependent on the precise user position. Rather the priority is to get a quick reply, based on a quite rough position of the user.

Other commercial services that are emerging include: friend finding, location of children, location-based gaming, and personal navigation, for example.

1.1 Cell Identity Positioning

All cellular telecommunications systems are typically divided into cells, each cell being served by one specific base station. Each base station may serve more than one cell. From a positioning and navigation perspective, the particular cell in which a specific wireless terminal (such as a user equipment unit ["UE"]) is located should be known in the cellular system. Hence, after determination of the geographical area covered by a specific cell, it can be stated that the wireless terminal is located somewhere within the geographical area, as long as the wireless terminal is connected and the reported cell identity of the serving cell is equal to the cell identity of the particular geographical area.

In some systems, among these the WCDMA (Wideband Code Division Multiple Access) system, the preferred representation of the geographical extension of the cell is given by a cell identity positioning method which uses the cell polygon format. The cell polygon format is described, e.g., by 3GPP, TS 23.032, "Universal Geographical Area Description (GAD)". The extension of a cell is described by the corners (e.g., from three to as many as fifteen corners) of a closed polygon which does not intersect itself. FIG. 1 shows an non-limiting example of a cell polygon with corners A-E. The RBS (Radio Base Station) is normally located close to one of the corners of the cell polygon which the RBS serves.

The format is two-dimensional and the corners are determined as pairs of longitudes and latitudes in the WGS84 geographical reference system and as described in 3GPP, TS 23.032. FIG. 2 is a depiction of an example format of an information element (IE) (such as a 3GPP Polygon message information element (IE)) which can be included in a message, such as a LOCATION REPORT message that is returned to the core network over the RANAP interface (see, e.g., 3GPP, TS25.413, "UTRAN Iu interface RANAP signaling") after a successful cell identity positioning.

Due to the complexity of the radio propagation, the cell polygon format is only an approximation of the extension of the true cell. The selection of the polygon format is dictated by the need to have a reasonably flexible geographical representation format, taking e.g. computation complexities and reporting bandwidths into account.

Since the polygon format approximates the cell extension, the polygon is normally pre-determined in the cell-planning tool to represent the cell extension with a certain confidence. The confidence is the probability that the terminal is actually located within the reported region, in this case bounded by the cell polygon.

1.2 Round Trip Time and TA Positioning

The accuracy of the cell identity positioning method described above is limited by the size of the cell, something that prevents it from being used in more sophisticated navigation applications. Its main advantages include a very low response time as well as the fact that it is widely spread and always available where there is cellular coverage. The cell identity method is also straightforward to implement and has no impact on the user equipment unit. The advantages has lead to an interest for the development of enhanced cell identity (E-cell ID) positioning methods that aim at enhancing the accuracy of the basic cell identity method at the same time as the advantages of the method are retained.

The most important of these enhanced cell identity (E-cell ID) positioning methods comprises augmenting the cell D id with round trip time ("RTT", in WCDMA parlance) or timing advance ("TA", in GSM parlance) measurements.

This principle for enhanced cell identity positioning aims at combining the cell extension model (the polygon) with a distance measure. The round trip time measurement principle is depicted in FIG. 3. Briefly, the travel time of radio waves from the RBS to the UE and back is measured. The distance r from RBS to UE then follows from Equation 1. In Equation 1, RTT is the round trip time and c is the speed of light.

$$r = c\frac{RTT}{2} \qquad \text{Equation 1}$$

Thus, FIG. 3 shows cell identity positioning combined with round trip time. As illustrated in example fashion in FIG. 3, the round trip time measurement alone defines a circle, or if the inaccuracy is accounted for, a circular strip around the RBS. By combining this information with the cell polygon, a left angle (LA) and right angle (RA) of the circular strip can be computed. The terminal position is determined as the intersection of the serving cell and the circular strip S. In the WCDMA system the reported position is given by the left angle (LA) and the difference between the right angle and the left angle (RA-LA).

1.3 High Precision Positioning

As used herein, high precision positioning methods are used to denote or comprise any positioning methods that have a potential to meet the North-American E-911 emergency positioning requirements. Methods that meet these requirements are capable of obtaining positioning accuracies including those of either (1) (terminal based) 50 meters (67%) and 150 m (95%), or (2) or (network based) 100 meters (67%) and 300 m (95%). "Terminal based" refers to positioning technology where the critical positioning technology resides in the wireless terminal. "Network based", on the other hand, refers to the situation where the critical parts of the positioning technology resides in any of the network nodes. For examples, A-GPS is terminal based but Cell ID is network based.

1.4 Assisted GPS and A-GNSS

Assisted GPS (A-GPS) positioning is an enhancement of the global positioning system (GPS). See, e.g., E. D. Kaplan, *Understanding GPS—Principles and Applications*. Norwood, Mass.: Artech House, 1996. FIG. 4 shows an example of A-GPS implemented in a cellular communication system, in this case a WCDMA system. In the system of FIG. 4 a radio network controller (RNC) acts as the node that collects, refines, and distributes assistance data to the terminals (denoted user equipment (UE) in WCDMA). The core network (CN) requests positioning of a UE over the RANAP interface. In response the RNC may use various kind of A-GPS techniques, all these techniques do however build on assistance data being handled by a node in the cellular communication system. The RNC orders positioning measurements to be performed in the UE, measurements that are performed by dedicated A-GPS receiver hardware in the terminals. These receivers detect GPS transmissions from the satellites that are also denoted space vehicles (SVs).

Thus, FIG. 4 shows an example A-GPS positioning system wherein GPS reference receivers attached to, e.g., a cellular communication system, collect assistance data that, when transmitted to GPS receivers in terminals connected to the cellular communication system, enhance the performance of the GPS terminal receivers. Performance enhancement is described, e.g., in A. Kangas and T. Wigren, "Location coverage and sensitivity with A-GPS", URSI EMP-S, Pisa, Italy, May, 2004. Typically, A-GPS accuracy can become as good as ten meters also without differential operation. The accuracy becomes worse in dense urban areas and indoors, where the sensitivity is often not high enough for detection of the very weak signals from the GPS satellites.

Additional assistance data is collected from the cellular communication system directly, typically to obtain a rough initial estimate of the position of the terminal together with a corresponding uncertainty of the initial estimate. This position is often given by a cell identity positioning step, i.e., the position of the terminal is determined with cell granularity. Alternatively, a more accurate position can be obtained by round trip time positioning.

1.5 OTDOA-IPDL and E-OTD (GSM)

Similarly to A-GPS, the downlink Observed Time Difference Of Arrival (OTDOA) positioning method, possibly combined with Idle Periods in the DownLink (IPDL), is based on time of arrival measurements. However, in this case measurements of transmissions from several RBSs are performed in the UE. The corresponding method in GSM is denoted E-OTD.

An advantage with OTDOA-IPDL as compared to A-GPS is the fact that the signal strengths are higher, something that enhances the ability to perform positioning indoors. The accuracy is expected to be somewhat worse than that of A-GPS though, mainly because the radio propagation conditions are worse along the surface of the earth than when GPS radio signals are received from satellites at high elevation angles.

1.6 AECID Positioning

This Adaptive Enhanced Cell Identity (AECID) positioning method is discussed in PCT Patent Application PCT/SE2005/001485, entitled "Adaptive Enhanced Cell Identity Positioning". A block diagram of the AECID positioning method is depicted in FIG. 5. The AECID positioning algorithm is based in part on the polygon format discussed above and an algorithm for computation of a polygon, from a cluster of tagged high precision position measurements. The main steps of the AECID algorithm include tagging of high precision position measurements (e.g. A-GPS measurements); collection of all high precision measurements with the same tag in high precision measurement clusters; calculation of a (tagged) polygon; and, storage of the tagged polygons in a database of polygons. When an AECID positioning is to be performed, the following steps are performed: (a) Determination of at least one of: (i) Cell Ids of detected cells; (ii) Auxiliary connection information (e.g. RAB, time); and (iii) Quantized auxiliary measurements (e.g. RTT or noise rise); formation of the tag; retrieval of the polygon corresponding to the formed tag; and reporting of the polygon over RANAP or PCAP.

2.0 Secure User Plane Location (SUPL)

Positioning, e.g. in a WCDMA network can build on signaling either from the CN to the WCDMA RAN over RANAP, using the WCDMA control plane; from the SAS to the WCDMA RAN over PCAP, using the WCDMA control plane; or using the WCDMA user plane, resulting in a positioning that is completely transparent to the WCDMA RAN. This last alternative, using the WCDMA user plane, is understood with reference to FIG. 6.

2.1 Baseline WCDMA Architecture

An example WCDMA system comprises one or (preferably many more) terminals, a radio access network (RAN); a core network (CN); end users; and interfaces. Each are briefly discussed below for an example WCDMA system. Those skilled in the art will appreciate that a GSM system differs in some respects from the GSM system, but that the technology described herein is also applicable to GSM.

In WCDMA, the wireless terminals are often called user equipments or "UEs" for short. The terminals are controlled by, and communicate with the radio access network (RAN) over the Radio Resource Control (RRC) protocol. User data like speech and the control signaling is performed on separate channels, belonging to the so called user plane and control plane, respectively. The signaling for positioning, that e.g. orders measurements and reports back results (when Secure User Plane Location (SUPL) is not used) takes place in the control plane. Many times the terminal is equipped with hardware that enables accurate position determinations, e.g. GPS receiver hardware. In some embodiments the terminal is capable of generating an accurate "universal time", the same "universal time" being established in the SLP. Today, GPS and A-GPS capable terminals can achieve this.

The radio access network (RAN) comprises nodes such as radio base stations (RBSs) and radio network controllers (RNCs). The RBS and the RNC communicates over the so called NBAP interface.

The core network (CN) is connected to the radio access network (RAN) over the RANAP interface. This interface serves, e.g., to carry positioning requests together with the requested quality of service. In the other direction (from RAN to CN) the messages carry computed positions using one of seven defined formats. Auxiliary information associated with the positioning is also carried in this direction.

End users are connected to the core network (CN). End users provide various services that are available, e.g., to the wireless terminals (UEs).

In terms of interfaces, when control plane positioning is used, positioning requests and results travel across the majority of the interfaces shown in FIG. 6. At each interface dedicated signalling takes place, requests are issued, results and failures are reported. The result is a fairly involved positioning sequence. The drawback with this solution is a need to test interoperability at each interface. Furthermore, the end user (perhaps a service provider) becomes highly dependent of the positioning functionality provided by the operator. One driving force behind the development of Secure User Plane Location (SUPL) has been a desire by end users to become less dependent on the (often locked in) positioning services of an operator, making it difficult to reach profitability for new positioning services.

2.2 Secure User Plane Location (SUPL) Fundamentals

Secure user plane location (SUPL) exploits a standard data (packet) connection that is first established all the way from the end user to the terminal or back. No dedicated control plane positioning signaling resources need to be used. In this way it is sufficient for the end user to subscribe to pure bandwidth over the air, rather than having to pay for special positioning functionality provided by the operator.

In Secure User Plane Location (SUPL), control signalling is still needed, and is generally handled as follows:

A removal of all interfaces except the RRC interface (the RRLP interface in GSM), as far as positioning is performed. The logic and functionality provided by the interfaces from the end user to the RBS are instead provided by a SUPL location provider (SLP) server.

The RRC (RRLP) interface is embedded (simulated) into the user plane packet data connection.

The control plane part of the location signalling of the terminal is interfaced to the bit stream representing the RRC (RRLP) interface, so that the terminal can behave as in the control plane positioning case, despite the fact that the SUPL data connection is used for information transfer.

The control plane part of the location signalling that normally is terminated in the RNC but is now implemented in the SLP, is interfaced to the bit stream representing the RRC (RRLP) interface, so that the SLP can behave as an RNC as in the control plane positioning case, despite the fact that the SUPL data connection is used for information transfer.

2.3 Present SUPL Functionality

Presently the Open Mobile Alliance (OMA) standard (www.openmobilealliance.com) for secure user plane location (SUPL) implements the following positioning methods: Cell ID; GPS (stand alone); A-GPS; OTDOA-IPDL; and E-OTD; all of which have been at least briefly discussed above. TA measurements are also available in SUPL applied to GSM. It is an inherent property and a design principle of Secure User Plane Location (SUPL) to be independent on any functionality of the radio access network (RAN), in either GSM or WCDMA. For this reason all information needed for positioning needs to be provided by an entity known as the SULP Location Provider (SLP) or be measured by the terminal. An example of this is the need for additional configuration of geographical cell descriptions in the SLP.

Unfortunately, as a major limitation, Secure User Plane Location (SUPL) has no access to RBS round trip time measurement in WCDMA. The fact that information in the RAN is not available to Secure User Plane Location (SUPL) means that measurements that are not performed by the terminal cannot be used for SUPL. This applies e.g., to measurements of the radio base stations. Of particular importance for positioning in WCDMA is the measurement of round trip time that is performed in the RBS. This measurement, which is accurate to 0.5 chips, is the backbone for so-called RTT positioning. Generally, RTT positioning is considered to be the best among the positioning methods for enhanced cell ID. The fact that SUPL cannot access information obtained solely in the RAN, hence prevents RTT positioning in its normal form to be implemented for SUPL.

A remedy for lack of access to RBS round trip time measurement in SUPL would be to perform a round trip time measurement in the terminal instead of the base station. This should be seem to be straightforward given the apparently advantageous facts that (1) RTT measurements are normally performed by detection of the first finger in the RAKE receiver that has a sufficient amount of collected energy; and (2) radio base stations and terminals implement the same type of receivers.

Unfortunately, these advantageous facts are not sufficient for RTT positioning to be implemented successfully in Secure User Plane Location (SUPL). This is because the start of downlink and uplink frames, as seen in the radio base station, are not required to be time aligned. For this reason there is an unknown time bias in the radio base station, that adds to any measured round trip time in the terminal. This time bias needs to be measured in the radio base station in order to be able to compensate in the SUPL location provider (SLP) server, and to arrive at the correct round trip time. However, since also a measurement of this RBS time bias would be internal to the RAN, SUPL has no way of using the information and thus RTT positioning remains impossible to implement for SUPL over WCDMA. A further complication is that the uplink is not aligned between terminals—hence establishment of the bias for one terminal is not helpful for other terminals.

What is needed, therefore, and an object of the present invention, are one or more of apparatus, methods, techniques and systems for determining the position of a wireless terminal in a radio access network.

SUMMARY

In one of its aspects the technology concerns a method of determining a position of a wireless terminal in a radio access network using information of the travel time of radio waves between a base station and the wireless terminal, the travel time information being retrieved in a way consistent with SUPL positioning. The method comprises performing, at the wireless terminal, a time of arrival measurement for a respective downlink radio frame received from a node associated with a cell of a radio access network. The method thereafter uses the time of arrival measurement and an estimated time of downlink transmission from the node to make a determination of a distance between the wireless terminal (30) and the node. The distance so determined can be used to generate an ellipsoid arc for describing a round trip time positioning of the wireless terminal. As an optional enhancement, the method further includes generating a thickness dimension of the ellipsoid arc, the thickness dimension of the ellipsoid arc reflecting clock uncertainty.

Advantageously, the method further includes sending the plural time of arrival measurements from the wireless terminal to a server without invoking any radio access network protocol, and making the determination of the distance between the wireless terminal and the node at the server.

In an example implementation mode, the method further comprises determining the estimated time of downlink transmission from the node of the specific downlink radio frame by using: at least one of the plural time of arrival measurements; a geographical location of the wireless terminal; and, a geographical location of the node. The example implementation mode further comprises expressing the plural time of arrival measurements in a universal clock time, the universal clock time being maintained external to the radio access network.

Thus, in one of its aspects and an example of one of its contexts of employment, the technology can be utilized in conjunction with secure user plane location (SUPL) architecture and operation to facilitate measurement of the travel time of radio signals from a node of a radio access network (e.g., a base station node) to a wireless terminal. The method circumvents the otherwise need of a SUPL server to have radio access network-based measurements of the round trip travel time (RTT) positioning of the wireless terminal.

In another of its example aspects, the technology concerns a wireless terminal adapted to perform a time of arrival measurement for a downlink radio frame received from a node associated with a cell of a radio access network.

In an example embodiment, the wireless terminal comprises a universal reference acquisition unit adapted to facilitate expression of the time of arrival measurement relative to a universal clock time. The universal clock time is maintained external to the radio access network. In this example embodiment the wireless terminal further comprises a report unit adapted to report transmit a universal clock expression of the time of arrival measurement to an entity external to the radio access network and without invoking any radio access network protocol.

In an example implementation, the universal reference acquisition unit is further adapted to determine a geographical location of the wireless terminal. The report unit is further adapted to report the geographical location of the wireless terminal and a cell identifier of the cell to the external entity.

The external entity can be a Secure User Plane Location (SUPL) Location Platform (SLP) server.

In another of its example aspects, the technology concerns a server which is external to a radio access network. The server comprises an interface for receiving, from a wireless terminal of the radio access network and without invoking any radio access network protocol, plural time of arrival measurements for corresponding plural downlink radio frames received by the wireless terminal from a node associated with a cell of a radio access network. The server also comprises a terminal position determination unit adapted to determine a distance between the wireless terminal and the node, the distance being determined using a time of arrival measurement for a specific downlink radio reference frame and a time of downlink transmission from the node.

In an example embodiment, the terminal position determination unit is further adapted to estimate the time of downlink transmission from the node of the downlink radio frame and to use an estimated time of downlink transmission as the time of downlink transmission for determining the distance.

In an example implementation, the time of arrival measurement and the estimated time of downlink transmission are expressed relative to a universal clock time, the universal clock time being maintained external to the radio access network.

In an example implementation, the terminal position determination unit is further adapted to determine the distance between the wireless terminal and the node by using the time of arrival measurement, the estimated time of downlink transmission; a geographical location of the node, and, the geographical location of the wireless terminal.

Thus, one example aspect of the technology comprises a new wireless terminal-based time of arrival measurement. The new terminal-based time of arrival measurement performs a time of arrival measurement of a downlink radio frame.

The wireless terminal can be operated or configured in various modes. In a first mode, also known as the Consistent Hybrid mode, the wireless terminal periodically or occasionally makes an accurate time of arrival (TOA) measurement (using a universal reference time and an accurate position) so that the server can use the accurate time of arrival (TOA) measurement and the accurate position first to determine a time of downlink transmission from the radio base station using a computed distance separating the radio base station and the wireless terminal. Then, for a limited time interval thereafter, estimates of the time of downlink transmission from the node are used to compute the distance between the node and the wireless terminal. The first mode is "hybrid" in the sense that both accurate measurements and estimates are employed.

In a second mode, also known as the Consistent Accuracy mode, the wireless terminal consistently uses and/or provides some or all of the universal information to the server so that the server does not have to rely upon estimates, or so that the server can compute refined estimates with further enhanced accuracy. The second mode is practical in a situation in which universal reference acquisition unit of the wireless terminal has essentially continuous (e.g., permanent) and/or economical access to a universal reference source (e.g., a GPS satellite, for example). In general, by joint processing of similar information from several reporting terminals, the server can provide better accuracies than for one single terminal. Such joint processing can be performed by a Kalman filter or the like.

A third mode, also known as the Selective Hybrid mode, resembles the second mode (Consistent Accuracy Mode) in that the wireless terminal has the potential of consistently using and/or providing some or all of the universal information to the server so that the server does not have to rely upon estimates. However, unlike a second mode wireless terminal, a third mode wireless terminal also has the capability of selectively functioning in a hybrid mode if necessary.

Another example aspect of the technology involves means and/or method for determining a "universal time" and "accurate position" (GPS time, Galileo time, UTC time, etc.) of the time of arrival measurement of a downlink radio frame arrival, using the time established by, e.g., a satellite receiver of the terminal. (Comment: Cf. the first comment above)

Another example aspect of the technology is the use of high precision positioning capable terminals of opportunity (e.g. A-GPS or A-Galileo capable terminals, or OTDOA-IPDL capable terminals), determining an accurate geographical location and a cell ID associated with the time of arrival measurement performed in the terminal.

Another example aspect of the technology is method and apparatus for reporting of the measured time of arrival, at the geographical location, and of the cell ID over a SUPL data link to the SUPL location platform (SLP) server.

Another example aspect of the technology involves, in the SLP, for each cell, estimating (e.g. using Kalman filters) the time of transmission of the downlink frame from the radio base station (RBS). This aspect utilizes the principle that, since the location of the terminal that performs the time of arrival measurement is known in the SUPL (e.g. reported over the SUPL interface from the terminal), and since the location of the antenna of the cell of the RBS that serves the terminal is also known in the SLP (need to be configured as cell data), the travel time of radio waves from the terminal to the RBS can be determined. The difference between the measured time of arrival and the travel time of radio waves is then considered to be the sought RBS time of transmission, plus measurement uncertainties, expressed in universal time. This measured time of transmission is identical for all terminals of the cell, hence such measurements from plural terminals of the cell can be jointly processed in the Kalman filter to obtain a more accurate time of transmission than would be possible using a measured time of transmission combined from measurements of a single terminal. The Kalman filter can also be designed to incorporate an estimate of the drift rate of the estimate time of downlink transmission with respect to the universal time, a fact that enhances the performance and the maintenance of downlink time of transmission information for cells in the SLP.

Another example aspect of the technology involves, for terminals that perform only a time of arrival measurement, using the estimated time of transmission to compute a travel time of radio waves, thereby establishing the distance from an radio base station to the terminal, thereby achieving, e.g., a single trip time (STT) positioning method for SUPL. This is done by reporting time of arrival to the SLP, since, e.g., the SLP maintains the downlink time of transmission in universal time with Kalman filtering.

Yet another example aspect of the technology comprises method and apparatus for downlink SUPL signalling for ordering of joint high precision position, cell ID, and time of arrival measurements, for establishment of the time of transmission in the radio base station.

The technology is applicable to wireless terminals that include one or more of the following functionalities: GPS, A-GPS, Galileo, A-Galileo or Assisted Global Navigation Satellite System (A-GNSS) capable terminals. The technology enables a counterpart to the AFLT positioning method of the CDMA 2000 system.

By knowing the time of the last universal time alignment in the wireless terminal, and by starting a timer, the "age" of the time alignment is measured. Since the clocks of the terminal drift with respect to the universal time, and since the maximal or typical drift rate is known (at least approximately), signaling of the "age" of the time alignment to the SLP allows the SLP to determine the inaccuracy of the measured travel time, thereby establishing the thickness of the ellipsoid arc.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2 is a diagrammatic view of an information element associated with cell identity positioning.

FIG. 5 is a diagrammatic view of an example implementation of an Adaptive Enhanced Cell Identity (AECID) positioning method.

FIG. 6 is a diagrammatic view generally depicting conventional Secure User Plane Location (SUPL) Architecture and signaling.

FIG. 15A-FIG. 15D are diagrammatic views depicting signalling and/or information elements involved in requesting or reporting information elements such as time of arrival measurement, for example.

DETAILED DESCRIPTION

In the following description, for purposes of explanation and not limitation, specific details are set forth such as particular architectures, interfaces, techniques, etc., in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

3.0 Example Context of Technology Use

Figure 7:
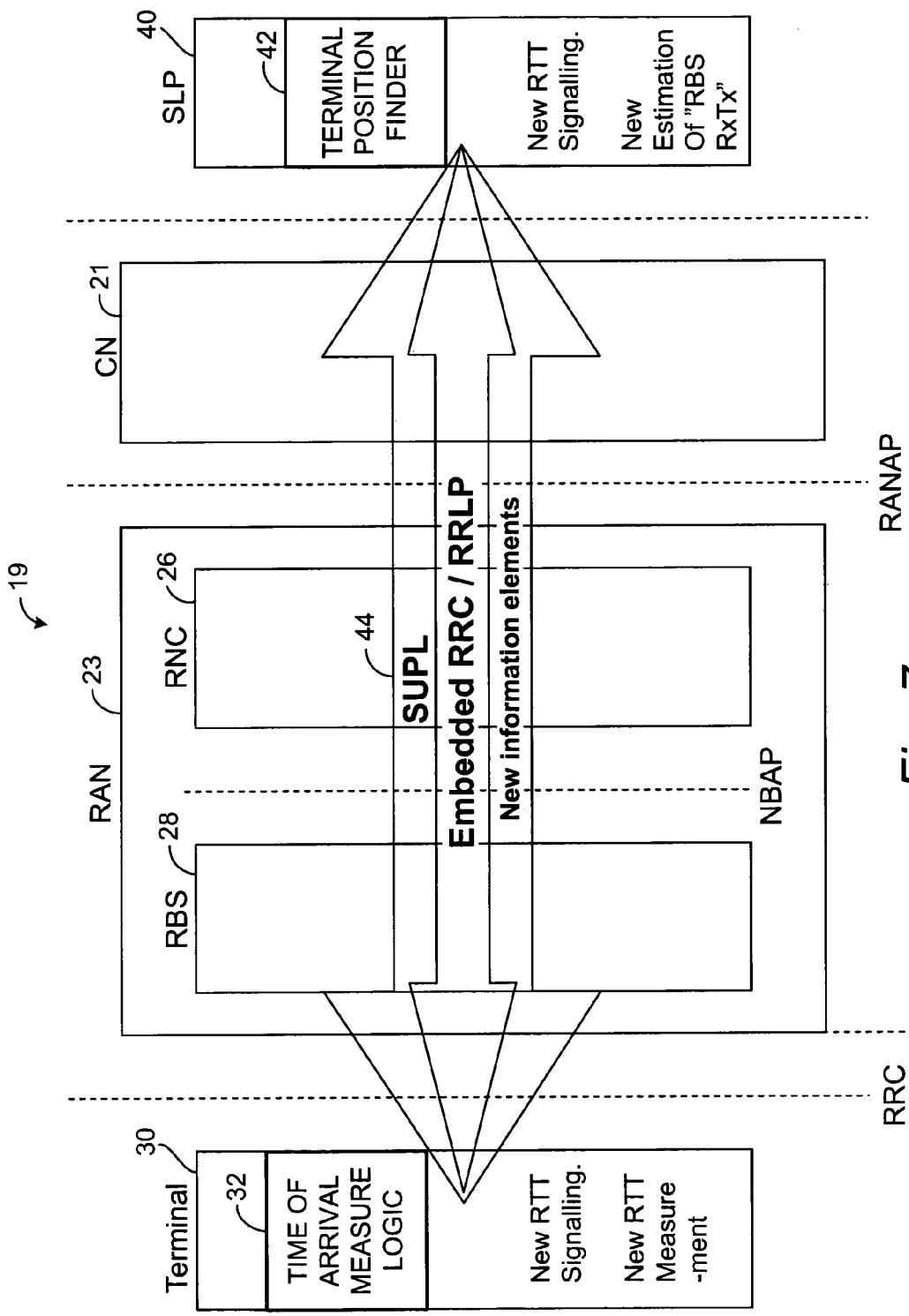
FIG. 7 is diagrammatic view generally depicting, e.g., Secure User Plane Location (SUPL) Architecture and signaling which includes and accommodates time of arrival measurement logic and a terminal position finder as well as new signaling for implementing same.

FIG. 7 shows a telecommunications system 19 comprising a core network (CN) 21 which communicates over a RANAP interface with a radio access network (RAN) 23. The radio access network (RAN) 23 comprises various types of nodes, such as radio network controller (RNC) 26 and radio base station (RBS) 28 (also known as a NodeB). The radio base station (RBS) 28 and radio network controller (RNC) 26 communicate over a NBAP interface. The radio base station (RBS) 28 in turn communicates over a RRC interface with one or more wireless terminals, one representative wireless terminal 30 being shown in FIG. 7.

FIG. 7 shows that wireless terminal 30 includes time of arrival measurement logic 32 that enables wireless terminal 30 to determine a time of arrival of a downlink radio frame received from a radio base station (RBS) 28. The radio base station (RBS) 28 is currently serving a cell in which wireless terminal 30 is situated.

The particular radio access network (RAN) 23 illustrated in FIG. 7 happens to belong or relate to a UTRAN type network. UTRAN is a radio access network of the Universal Mobile Telecommunications System (UMTS). UMTS is a third generation mobile communication system, which evolved from the Global System for Mobile Communications (GSM), and is intended to provide improved mobile communication services based on Wideband Code Division Multiple Access (WCDMA) access technology.

In view of the UTRAN example context of description, the wireless terminal 30 is also referred to herein as a user equipment unit (UE). The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units or wireless terminals can be fixed wireless devices, e.g., fixed cellular devices/terminals which are part of a wireless local loop or the like.

The technology described herein is not limited to radio access network type, and can be utilized in conjunction with other networks, such as GSM for example. Thus, the nomenclature of radio access network (RAN) 23 can vary, and may include nodes named differently, such as base station controller (BSC) node or base station transceiver (BTS), for example. Moreover, although typically a UTRAN or any other type radio access network has plural BSC/RNC nodes and plural BTS/RBS nodes, for sake of convenient illustration only one of each type of node is shown in FIG. 7.

FIG. 7 further shows server 40 which is external to radio access network 23. Server 40 has, as one of its main responsibilities, the task of determining the position of wireless terminals such as wireless terminal 30. The server 40 may be an entity which is consulted or queried when it is necessary or desirable to determine the location of wireless terminal 30. The need or motivation to determine the location of wireless terminal 30 can arise in various situations, such as locating the subscriber associated with the wireless terminal in case of an emergency; when the subscriber associated with the wireless terminal interrogates a service for the purpose of finding a closest restaurant, hotel, or other establishment; for friend finding, for locating children, for location-based gaming, and personal navigation, for example.

Since server 40 is external to radio access network (RAN) 23, server 40 (at least when determining position of wireless terminal 30) is not privy to information carried over protocols of the radio access network (RAN) 23 or the core network (CN) 21. Therefore, server 40 cannot resort to radio access network (RAN) 23 or core network (CN) 21 for determining position of wireless terminal 30. As explained hereinafter, in various modes described hereinafter, ability of the wireless terminal 30 to determine a time of arrival of a downlink radio frame received from a radio base station (RBS) 28 facilitates server 40 making a determination of the position of wireless terminal 30.

For sake of simplification, only one SUPL location provider (SLP) server 40 is shown in FIG. 7. It should be understood, however, that depending upon implementation and environment, several SUPL location provider (SLP) servers 40 may be needed by or used in conjunction with one or more radio access networks.

Server 40 includes a terminal position finder 42 which, using the time of arrival (of the downlink radio frame) information provided by wireless terminal 30, determines or generates a range of possible geographical positions for wireless terminal 30. The terminal position finder 42 can generate, for example, an ellipsoid arc which traces a range of possible radial positions of the wireless terminal 30 relative to the radio base station (RBS) 28.

As shown in FIG. 7, one example context of implementation of the present technology is in conjunction with Secure User Plane Location (SUPL). In particular, in the example, non-limiting context of FIG. 7, server 40 takes the form of a SUPL location provider (SLP) server. For sake of convenience, at times server 40 may in fact be referred to herein as SUPL location provider (SLP) server 40, although it should be kept in mind that the technology is not necessarily limited to SUPL. FIG. 7 further shows that the technology utilizes new Single Trip Time (STT) signaling between wireless terminal 30 and SUPL location provider (SLP) server 40. In particular, new information elements 44 (represented by arrow 44) are utilized in the SUPL signaling scheme for transmitting information pertinent to operation of time of arrival measurement logic 32 and terminal position finder 42.

4.0 Example Embodiment of Wireless Terminal

Figure 8:
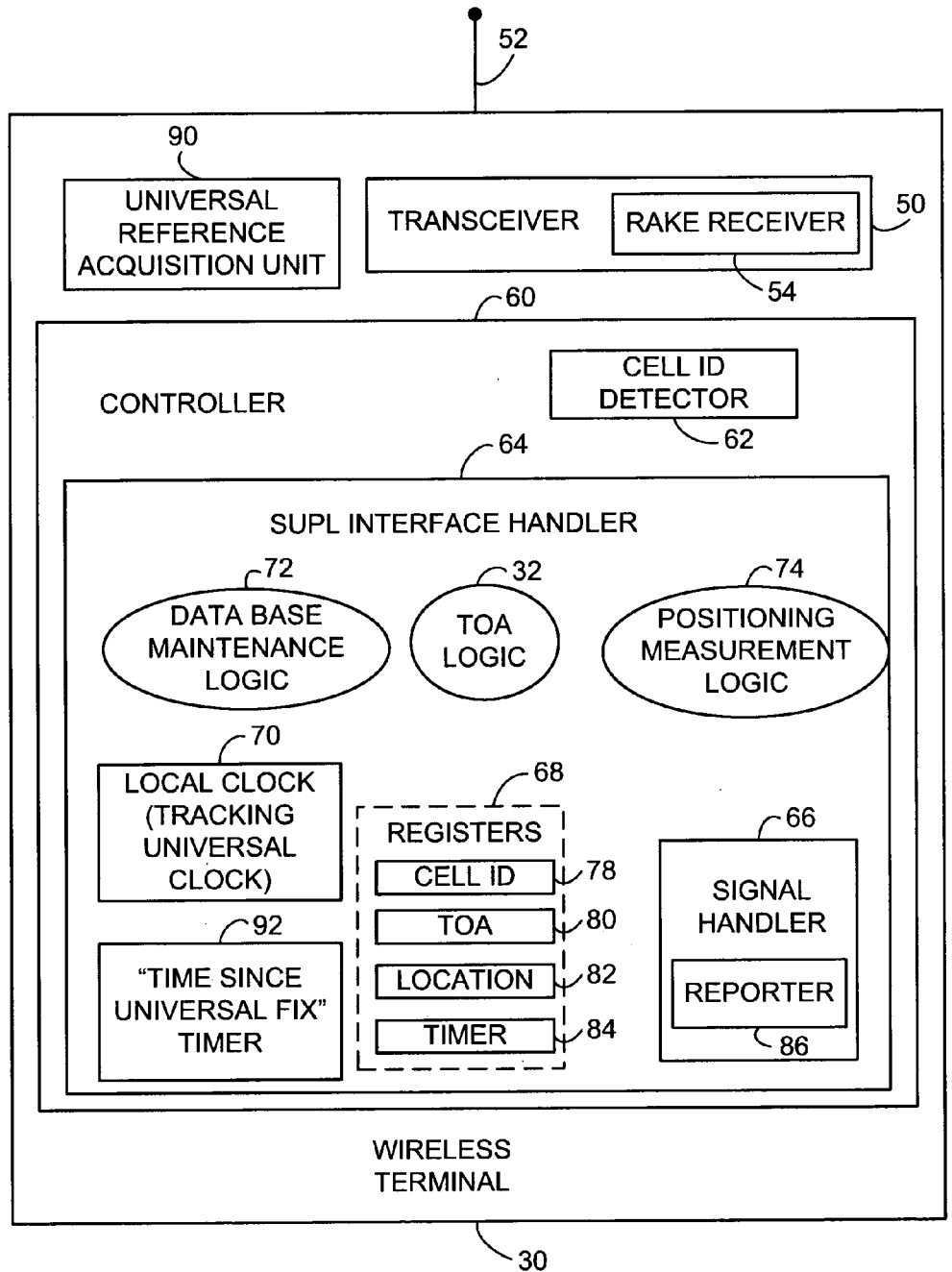
FIG. 8 is a diagrammatic view of a wireless terminal according to a non-limiting example embodiment.

FIG. 8 shows generic structure of wireless terminal 30 according to a non-limiting example embodiment. The wireless terminal 30 comprises transceiver 50 which cooperates with antenna 52 for transmission of information over an air or radio interface between wireless terminal 30 and radio base station (RBS) 28. In the illustrated embodiment, transceiver 50 includes one or more rake receivers 54. The wireless terminal 30 further comprises controller 60. Controller 60 includes a cell identity detector 62 and SUPL interface handler 64.

SUPL interface handler 64 comprises SUPL signal handler 66; a set of registers or memory storage locations 68; local clock 70; and logic for various routines or processes. The processes or routines for which SUPL interface handler 64 includes logic are data base maintenance logic 72; time of arrival (TOA) measurement logic 32; and positioning measurement logic 74. The registers or storage locations included in set of registers 68 include cell identification (ID) register 78, time of arrival register 80; wireless terminal location register 82; and timer register 84. The SUPL signal handler 66 includes reporter 86 which is responsible, e.g., for reporting the measured time of arrival (TOA) deduced by time of arrival measurement logic 32.

Wireless terminal 30 further comprises (or has an interface to) universal reference acquisition unit 90. The universal reference acquisition unit 90 can be, for example, a Global Positioning System (GPS) receiver unit or the like. The universal reference acquisition unit 90 can be included in wireless terminal 30 (e.g., integrated into wireless terminal 30), or can be attached or connected (e.g., as an adjunct) to wireless terminal 30.

Controller 60 maintains timer 92 which, as described subsequently, keeps track of time elapsed since a previous fetching of universal data from universal reference acquisition unit 90. The timer 92 is shown in FIG. 8 as also being known as a "time since last universal fix" timer.

In addition to the elements generally shown in FIG. 8, wireless terminal 30 is understood to have other functionalities and units. For sake of illustration, only those functionalities of wireless terminal 30 primarily germane to the operations described herein are shown.

5.0 Example Embodiment of Server

Figure 9:
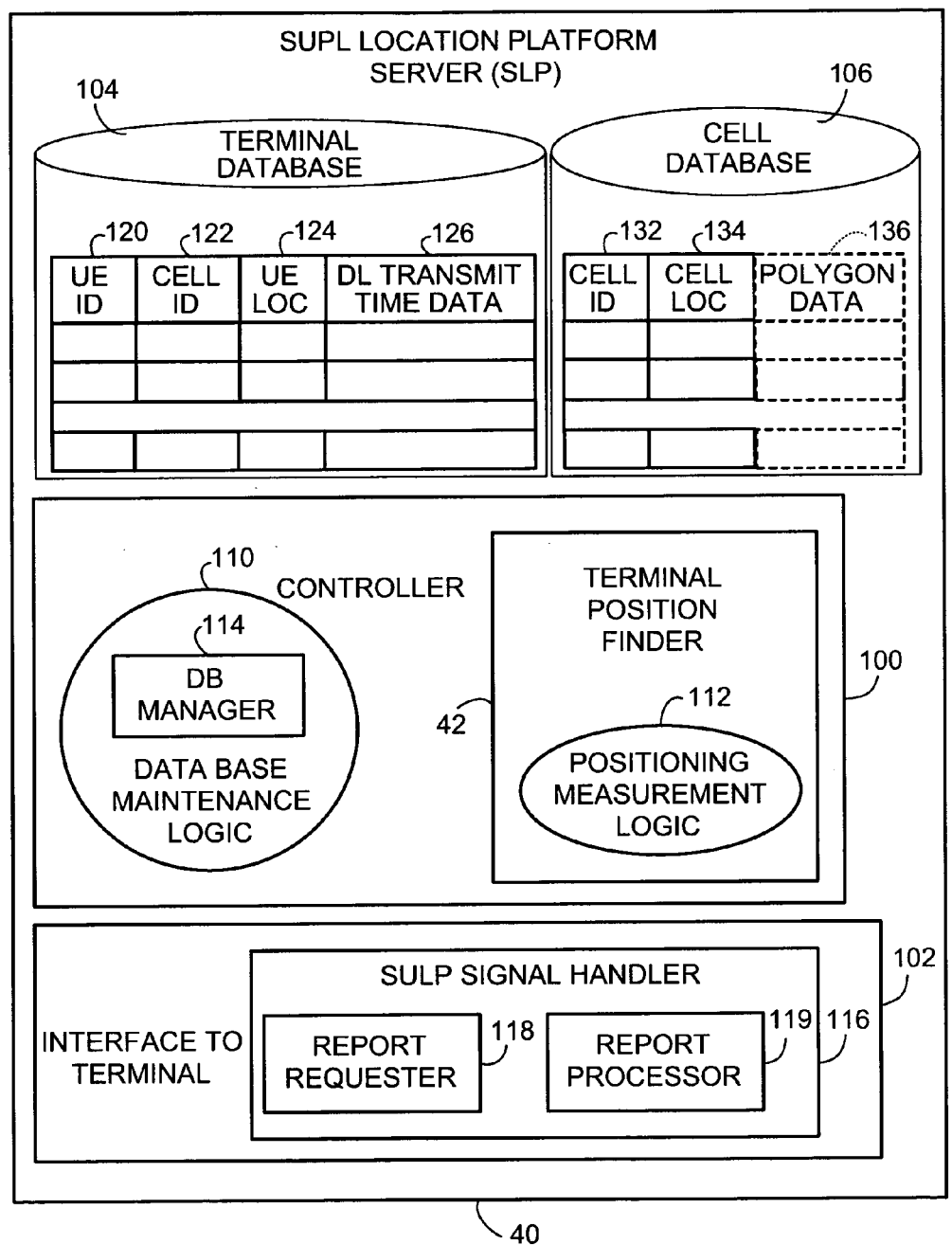
FIG. 9 is a diagrammatic view of a server according to a non-limiting example embodiment.

FIG. 9 shows generic structure of SUPL location provider (SLP) server 40 according to a non-limiting example embodiment. SUPL location provider (SLP) server 40 includes controller 100; wireless terminal interface 102; and databases (such as, for example terminal database 104 and cell database 106). Controller 100 includes logic for executing various processes or routines, such as data base maintenance logic 110 and terminal positioning measurement logic 112. The data base maintenance logic 110 can be viewed as performed by data base manager 114. The terminal positioning measurement logic 112 can be viewed as executed or performed by terminal position finder 42.

Wireless terminal interface 102 includes SUPL signal handler 116. SUPL signal handler 116 includes both report requester 118 and report processor 119. The SUPL signal handler 116 is involved in the generation and processing of signals, including the signaling hereinafter described with reference to FIG. 15A-FIG. 15D and particularly including the new information elements 44 described herein.

In addition to the elements generally shown in FIG. 9, SUPL location provider (SLP) server 40 is understood possibly to include other functionalities and units. Again for sake of illustration, only those functionalities of SUPL location provider (SLP) server 40 primarily germane to the operations described herein are shown.

6.0 Example Modes of Operation

6.1 First Mode: Consistent Hybrid Mode

Figure 10:
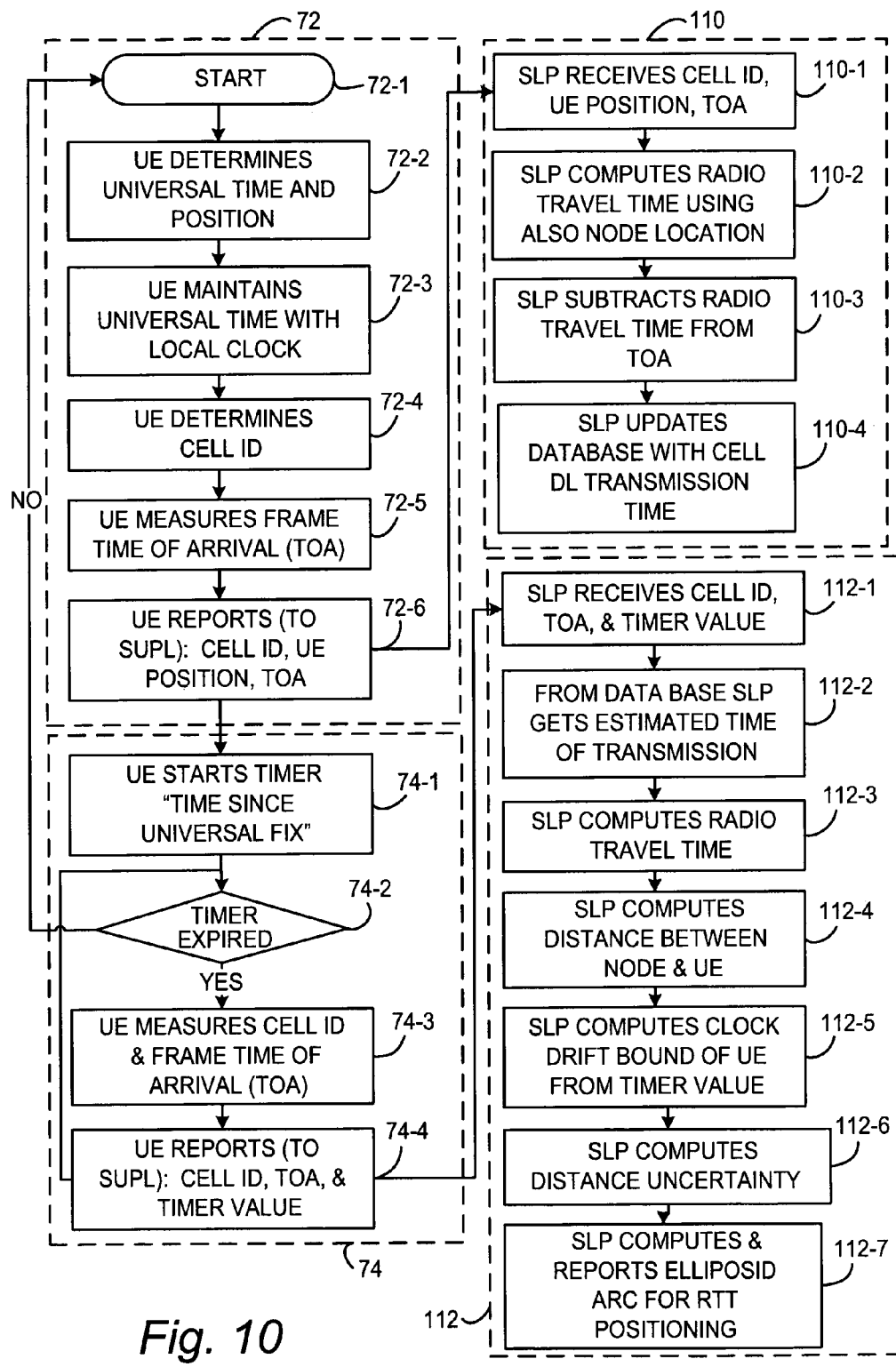
FIG. 10 is a flowchart depicting basic, representative actions performed in conjunction with wireless terminal data base maintenance logic, wireless terminal positioning measurement logic, server data base maintenance logic, and server terminal positioning measurement logic in accordance with an example, non-limiting first mode wireless terminal.

FIG. 10 illustrates basic acts (e.g., actions performed, steps implemented, or events occurring) in conjunction with a terminal positioning procedure according to a first example mode of the present technology. In the first mode, also known as the Consistent Hybrid mode, periodically or occasionally the wireless terminal 30 makes an accurate time of arrival (TOA) measurement (using a universal reference time) and an accurate position measurement so that the server can use the accurate time of arrival (TOA) measurement and the accurate position to first determine a time of downlink transmission from the radio base station, using a computed distance separating the radio base station and the wireless terminal. Then, for a limited time interval thereafter, estimates of the time of downlink transmission from the node are used to compute the distance between the node and the wireless terminal. The first mode is "hybrid" in the sense that both accurate measurements and estimates are employed. The first mode is consistently hybrid in that the common procedure is to follow a distance determination based on an accurate measurement (e.g., of the time of arrival) with one or more distance determinations that are based on estimates of time of downlink transmission.

As mentioned above, the terminal positioning procedure is essentially informationally insulated from radio access network (RAN) 23, and primarily involves wireless terminal 30 making a time of arrival (TOA) measurement that enables SUPL location provider (SLP) server 40 to determine a position of wireless terminal 30 for round trip travel time purposes.

In conjunction with these measurements and determinations of the first mode, FIG. 10 shows basic, representative acts performed by wireless terminal 30 and SUPL location provider (SLP) server 40. The left hand column FIG. 10 shows acts performed by wireless terminal 30. Acts performed by the process of data base maintenance logic 72 of wireless terminal 30 are particularly shown in the upper left hand portion of FIG. 10 while acts performed by the process of positioning measurement logic 74 of wireless terminal 30 are depicted in the lower left hand portion of FIG. 10. The right hand column of FIG. 10 shows acts performed by SUPL location provider (SLP) server 40. Acts performed by the process of data base maintenance logic 110 of SUPL location provider (SLP) server 40 are shown in the upper right hand portion of FIG. 10 and acts performed by the process of terminal positioning measurement logic 112 of SUPL location provider (SLP) server 40 are shown in the lower right hand portion of FIG. 10. Each process of FIG. 10 is framed by broken lines.

6.1.1 Data Base Maintenance by Terminal

For an active connection maintained by wireless terminal 30, the data base maintenance logic 72 is performed by SUPL interface handler 64 functionality of controller 60. Beginning of execution of data base maintenance logic 72 can occur shortly after beginning of the connection or when requested to do so by report requester 118 of SUPL location provider (SLP) server 40 and is depicted as act 72-1 of FIG. 10. Thus, either the wireless terminal can initiate the procedure and report to the SLP server 40 by some independent signaling mechanism, or the SLP server 40 may introduce the procedure and the wireless terminal 30 acts in response. Moreover, there can be signaling of a request, and signaling of results, of the information (e.g., information element(s)) needed for the method, e.g., "simultaneously" measured position, cell ID, time of arrival (TOA) for data base update on one hand (see FIG. 15C), and time of arrival (TOA), cell ID, timer for STT positioning, on the other hand (see FIG. 15D).

Act 72-2 involves the wireless terminal 30 (also known as the user equipment unit or "UE") determining the universal clock time and position. As used herein, universal clock time is a time that is maintained external to the radio access network and can be, for example, established with reference to one or more of the following: Global Positioning System (GPS), Assisted Global Positioning System (A-GPS), Galileo, Assisted Galileo (A-Galileo), or Assisted Global Navigation Satellite System (A-GNSS). To make the determination of act 72-2, data base maintenance logic 72 checks universal reference acquisition unit 90 to obtain or fetch the universal clock time and the current geographical position of wireless terminal 30. The fetched current geographical position of wireless terminal 30 can, in one example implementation, constitute coordinates (e.g. X, Y, and Z coordinates, or WGS 84 latitude, longitude, or any other agreed format) of wireless terminal 30. As part of act 72-2, the current geographical position of wireless terminal 30 is stored in wireless terminal location register 82. As act 72-3, the universal clock time is used to reset or adjust local clock 70, so that local clock 70 now tracks the universal clock time. Alternatively, an offset of bias between the local clock 70 and the universal clock time can be stored for future use and clock or time adjustments. Accordingly, wireless terminal 30 can now operate in or make reference to the universal clock time reference frame.

As act 72-4 the data base maintenance logic 72 determines the cell ID of the cell from which the wireless terminal 30 is receiving downlink radio frames of the connection in which wireless terminal 30 is participating. The cell, and consequently the cell ID, is associated with a particular radio base station 28 which is serving the connection. Typically the cell ID is broadcast or otherwise provided in some type of downlink channel in UTRAN, for example. The downlink channel bearing the cell ID is analyzed by controller 60, and in particular the cell ID of the downlink channel is detected by an entity such as cell identity detector 62, for example. The cell ID as detected by cell identity detector 62 is stored in a suitable location, such as cell ID register 78.

As act 72-5 the data base maintenance logic 72 works in conjunction with time of arrival measurement logic 32 to obtain a measurement of a time of arrival (TOA) for a downlink radio frame received as part of the connection. The time of arrival is detected by time of arrival measurement logic 32 interacting with the rake receivers 54 of transceiver 50. The specifics of the detection of the time of arrival of the downlink radio frame are analogous to a similar time of arrival measurement typically made by a radio base station in RTT positioning applications on the uplink using rake receivers of the radio base station. Once obtained by time of arrival measurement logic 32, the time of arrival (TOA) is stored by data base maintenance logic 72 in a suitable memory location such as in time of arrival register 80 shown in FIG. 8.

As act 72-6 the reporter 86 of data base maintenance logic 72 prepares and sends (through transceiver 50) to SUPL location provider (SLP) server 40 a report which can be considered a "location certain TOA report". Transmission of the location certain TOA report is an example of signaling between wireless terminal 30 and SUPL location provider (SLP) server 40, and is illustrated in FIG. 15C. The location certain TOA report of act 72-6 is included as and/or comprises one or more of the new information elements 44 involved in the signaling of the technology). In an example implementation, the location certain TOA report of act 72-6 includes as information elements: the cell ID (as stored in cell ID register 78), the UE position (as stored in wireless terminal location register 82), and the time of arrival (TOA) as determined at act 72-5 and stored in time of arrival register 80. The information elements of the location certain TOA report are thus sent outside of normal radio access network (RAN) and/or core network protocols.

6.1.2 Data Base Maintenance by Server

The report processor 119 of SUPL location provider (SLP) server 40 receives the location certain TOA report generated by act 72-6, and initiates (or resumes) execution of data base maintenance logic 110 performed by data base manger 114. Act 110-1 particularly shows receipt by data base manger 114 of the cell ID, the UE position, and the time of arrival (TOA) as most recently transmitted by wireless terminal 30. For this report, data base manger 114 stores the received information in an appropriate record in terminal database 104. In particular, for a record associated with the wireless terminal 30 (corresponding to a row of terminal database 104 as shown in FIG. 9), data base manger 114 stores an identifier for the reporting wireless terminal 30 in a UE ID field 120; the received cell ID in cell ID field 122; and, the UE location information in UE LOC field 124.

As act 110-2, data base maintenance logic 110 computes the radio travel time of the downlink radio frame (e.g., the downlink travel time from the radio base station (RBS) 28 to wireless terminal 30). The computation of act 110-2, e.g., the computation of the radio travel time of the downlink radio frame, involves (1) determining the distance separating the wireless terminal 30 from the radio base station (RBS) 28 at the time of the previous report, and then (2) dividing such distance by the speed of light.

The geographical position of the wireless terminal 30 at the time of the previous report is included in the location certain TOA report of act 72-6. As a particular example, the geographical position of the wireless terminal 30 at the time of the previous report can be X, Y, and Z coordinates (or WBS 84 latitude, longitude, or any other agreed format) as obtained from universal reference acquisition unit 90. The geographical position of the radio base station (RBS) 28 (which also can be in the form of X, Y, and Z coordinates or alternatives such as those mentioned above, for example) can be pre-stored or configured at SUPL location provider (SLP) server 40, such as in cell database 106. As a first aspect of act 110-2, the data base maintenance logic 110 takes the difference between (e.g., the coordinates of) the geographical location of wireless terminal 30 and the geographical location of radio base station (RBS) 28.

Figure 1:
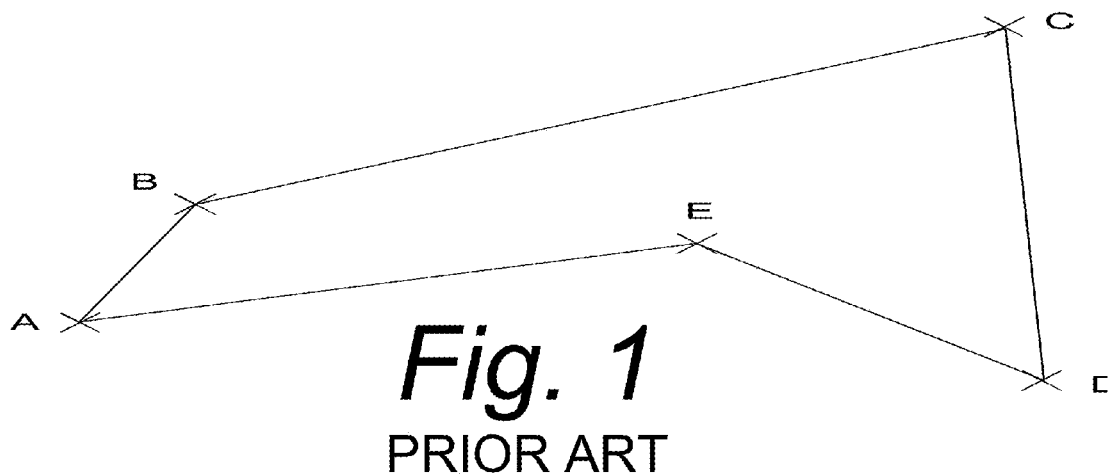
FIG. 1 is a diagrammatic view showing a non-limiting example cell polygon.

Concerning the geographical location of radio base station (RBS) 28, FIG. 9 shows an example implementation of cell database 106 as being of a type that has a record for each cell maintained in cell database 106. Each record in cell database 106 has a cell ID field 132 to identify the cell served by radio base station (RBS) 28, as well as a field for cell location information, e.g. cell location field 134; and a field for cell antenna location, e.g., antenna location field 136. In addition, for each record in cell database 106 there is an optional further field with cell polygon data, e.g., polygon data field 138. The polygon data field 138 can include information such as that previously illustrated or described, e.g., with reference to FIG. 1 and FIG. 2.

As act 110-3 the data base maintenance logic 110 subtracts the radio travel time determined at act 110-2 from the time of arrival (TOA) as measured and reported by wireless terminal 30, and thereby determines a downlink (DL) transmit time. Since the time of arrival (TOA) used for the calculation of act 110-3 is expressed in universal time, the result of act 110-3 is a universally-expressed time at which radio base station (RBS) 28 transmitted the downlink frame. That is, the result of DL transmit time (also known as cell DL transmission time) is the time (expressed in the universal time of universal reference acquisition unit 90) at which the downlink frame was transmitted by radio base station (RBS) 28. As act 110-4, the DL transmit time is stored in a DL transmit time data field 126 of terminal database 104, e.g., the SLP updates terminal database 104 with the cell downlink transmission time.

In case a Kalman filtering technique is used for the update, it is possible to avoid storage of the cell downlink transmission time in a database. The received information is then processed directly, in order to produce an updated DL transmit time of the cell. This technique is referred to as recursive estimation and is understood by reference to, e.g., T. Soderström, Discrete Time Stochastic Systems. London, UK: Springer, 2002.

6.1.3 Positioning Measurement by Terminal

Returning to activity in wireless terminal 30, after making its location certain TOA report of act 72-6, the positioning measurement logic 74 is invoked and (as act 74-1) starts timer 92 which keeps track of the time elapsed since the previous fetching of universal data from universal reference acquisition unit 90. As act 74-2, the positioning measurement logic 74 checks whether the value of timer 92 has reached a predetermined value at which timer 92 expires.

The predetermined expiration value of timer 92 is chosen to be of a value that reflects the probability that the terminal clock drift with respect to the universal time has made the measured time of arrival measurement uncertain to an extend that that new universal information should be acquired for wireless terminal 30. If it is determined as act 74-2 that timer 92 has expired, execution or performance of data base maintenance logic 72 is initiated or resumed as reflected in FIG. 10 by a return to act 72-1. On the other hand, if timer 92 has not expired when checked at act 74-2, further aspects of positioning measurement logic 74 are performed. In particular, as act 74-3 the time of arrival measurement logic 32 is again invoked to determine a time of arrival (TOA) for another downlink radio frame. The determination of the time of arrival (TOA) is similar to that of act 72-5. The time of arrival (TOA) is stored in time of arrival register 80, as is the value of timer 92 (stored in timer register 84) which corresponds to the time at which the time of arrival (TOA) was determined at act 74-3.

In case of no expiration, as act 74-4 the positioning measurement logic 74 employs reporter 86 to makes another report to SUPL location provider (SLP) server 40. The report of act 74-4 is a "location uncertain TOA report" in the sense that, at the time the time of arrival (TOA) measurement of act 74-3 was undertaken, the exact geographical position or location of wireless terminal 30 is uncertain. For example, the terminal clock drift with respect to the universal time base may have made the measured time of arrival measurement uncertain to an extent measured and reported by the timer value.

An example implementation of the location uncertain TOA report of act 74-4 is illustrated in FIG. 15D as including the following new information elements 44: the cell ID for the cell from which the downlink radio frame was obtained (stored in cell ID register 78), the time of arrival (TOA) as determined at act 74-3 and stored in time of arrival register 80; and the value of timer 92 (corresponding to the time of determination of the time of arrival (TOA)) stored in timer register 84.

Like the location certain TOA report, the location uncertain TOA report is sent by reporter 86 using SUPL signaling as shown in FIG. 15D. As such, the location uncertain TOA report is transmitted from wireless terminal 30 to SUPL location provider (SLP) server 40 through radio access network (RAN) 23 but without resort to radio access network protocols or core network protocols.

6.1.4 Terminal Positioning by Server

The report processor 119 of SUPL signal handler 116 receives and processes the location uncertain TOA report for SUPL location provider (SLP) server 40. In particular, as shown by act 112-1 of FIG. 10, the SUPL location provider (SLP) server 40 receives the cell ID, the time of arrival (TOA) (as determined at act 74-3), and the value of timer 92 included in the most recent location uncertain TOA report. This information is provided to terminal position finder 42. However, at this time terminal position finder 42 does not receive the exact position of wireless terminal 30. That is, unlike with the location certain TOA report, the radio access network (RAN) 24 does not receive geographical information such as coordinates of the wireless terminal 30.

Although terminal position finder 42 does not receive geographical information regarding the location of wireless terminal 30, terminal position finder 42 does have access to terminal database 104. As explained subsequently, using terminal database 104, and using particularly recent values stored in DL transmit time data field 126 for the cell, the terminal position finder 42 can estimate a time of transmission $t_{DLtransmit}^{CID}(k)$ of the downlink radio frame (k) (corresponding to the location at which the time of arrival (TOA) measurement of the uncertain TOA report was made). Recall that although it is the cell DL transmit time that is used, this is the same for all terminals of the cell. The estimation of the time of transmission $t_{DLtransmit}^{CID}(k)$ of the downlink radio frame (k) is further described in an example, non-limiting mode in section 8.5 hereof, which refers, e.g., to use of a Kalman filter for continuous recursive estimation of $t_{DLtransmit}^{CID}$ one filter for each cell.

After having determined as act 112-2 the estimate of the time $t_{DLtransmit}^{CID}(k)$ at which the downlink radio frame (k) was transmitted, as act 112-3 terminal position finder 42 can determine the current radio travel time. The current radio travel time as determined by act 112-3 is the difference between the report time of arrival (TOA) of frame (k) (as reported in the location uncertain TOA report) and the estimate of the time $t_{DLtransmit}^{CID}(k)$ at which the downlink radio frame (k) was transmitted (determined as act 112-2).

Knowing the radio travel time of the frame (k) (determined as act 112-3), and the geographical position of radio base station (RBS) 28 (accessed from cell location field 134 of cell database 106), as act 112-4 the terminal position finder 42 can estimate the distance between radio base station (RBS) 28 and wireless terminal 30.

As previously mentioned with reference to act 74-1, wireless terminal 30 employs timer 92 to measure the time since the last time universal time was established in wireless terminal 30 and report this elapsed time value to SUPL location provider (SLP) server 40 in conjunction with act 74-4. Knowledge of this elapsed time allows SUPL location provider (SLP) server 40 to estimate the clock drift error of wireless terminal 30 with respect to the data in DL transmit time data field 126 of terminal database 104. Accordingly, as act 112-5 the terminal positioning measurement logic 112 computes a clock drift bound of wireless terminal 30 from the value of timer 92 received in the location uncertain TOA report. The clock drift bound of wireless terminal 30 translates into a distance uncertainty, e.g., an uncertainty distance (speed of light). Act 112-6 depicts terminal positioning measurement logic 112 computing the distance of uncertainty.

Knowing now the estimated distance separating the fixed-position radio base station (RBS) 28 and the possibly traveling wireless terminal 30, as act 112-7 the terminal position finder 42 can compute or generate an ellipsoid arc which represents a range of possible geographical positions for wireless terminal 30. An example of such an ellipsoid arc is illustrated as arc 140 in FIG. 13. The distance of uncertainty computed as act 112-7 is used to generate a thickness 142 of the arc 140 in accordance with 3GPP TS 23.032. Act 112-7 further involves SUPL location provider (SLP) server 40 reporting the ellipsoid arc 140 and thickness 142 over SUPL to wireless terminal 30. The reporting (of act 112-7) of the ellipsoid arc 140 and of the thickness 142 can, in alternate embodiments and modes, be: (1) transmitted to wireless terminal 30; (2) transmitted to a third party requesting the position of the positioned user (e.g., to be used by police that track a vehicle hosting or carrying the wireless terminal); and/or (3) collected (e.g., at server 40) for other, e.g. statistical, purposes in SLP node.

With the acts of FIG. 10 having thus been described, it is again seen that the left column of FIG. 10 displays what happens in wireless terminal 30 and the right column displays what happens in SUPL location provider (SLP) server 40. For both wireless terminal 30 and SUPL location provider (SLP) server 40 there are two main sequences (e.g., logic routines or processes). The first sequence of acts (acts 72-1 through 72-6 of data base maintenance logic 72 and acts 110-1 through 110-4) supports the buildup of a DL time of transmission database in SUPL location provider (SLP) server 40, e.g., buildup of DL transmit time data field 126 per cell. While than per terminal, measurements are reported per terminal, the end result is essentially the DL transmit time per cell.

In one of its aspects as illustrated, e.g., in FIG. 10, the technology concerns a method of determining a position of wireless terminal 30 in radio access network (RAN) 23. The method comprises performing, at the wireless terminal, plural time of arrival (TOA) measurements for respective plural downlink radio frames received from a node (the node being associated with a cell of a radio access network). In one example mode, the method thereafter uses a time of arrival measurement for a specific downlink radio reference frame and an estimated time of downlink transmission from the node of the specific downlink radio frame to make a determination of a distance between the wireless terminal and the node. The distance so determined can be used to generate an ellipsoid arc for describing a round trip time positioning of the wireless terminal. As an optional enhancement, the method further includes generating a thickness dimension of the ellipsoid arc, the thickness dimension of the ellipsoid arc reflecting clock uncertainty.

In an example implementation mode shown in FIG. 10, the method further comprises determining the estimated time of downlink transmission from the node of the specific downlink radio frame by using: at least one of the plural time of arrival measurements; a geographical location of the wireless terminal; and, a geographical location of the node. The example implementation mode further comprises expressing the plural time of arrival measurements in a universal clock time, the universal clock time being maintained external to the radio access network.

6.2 Second Mode: Consistent Accuracy Mode

In a second mode, also known as the Consistent Accuracy mode, the wireless terminal 30 consistently uses and/or provides some or all of the universal information to server 40 so that the server 40 does not have to rely upon estimates or so that the server 40 can significantly enhance the accuracy of said estimates. The second mode is practical in a situation in which universal reference acquisition unit 90 of wireless terminal 30 has essentially continuous (e.g., permanent) and/or economical access to a universal reference source (e.g., a GPS satellite, for example).

Figure 11:
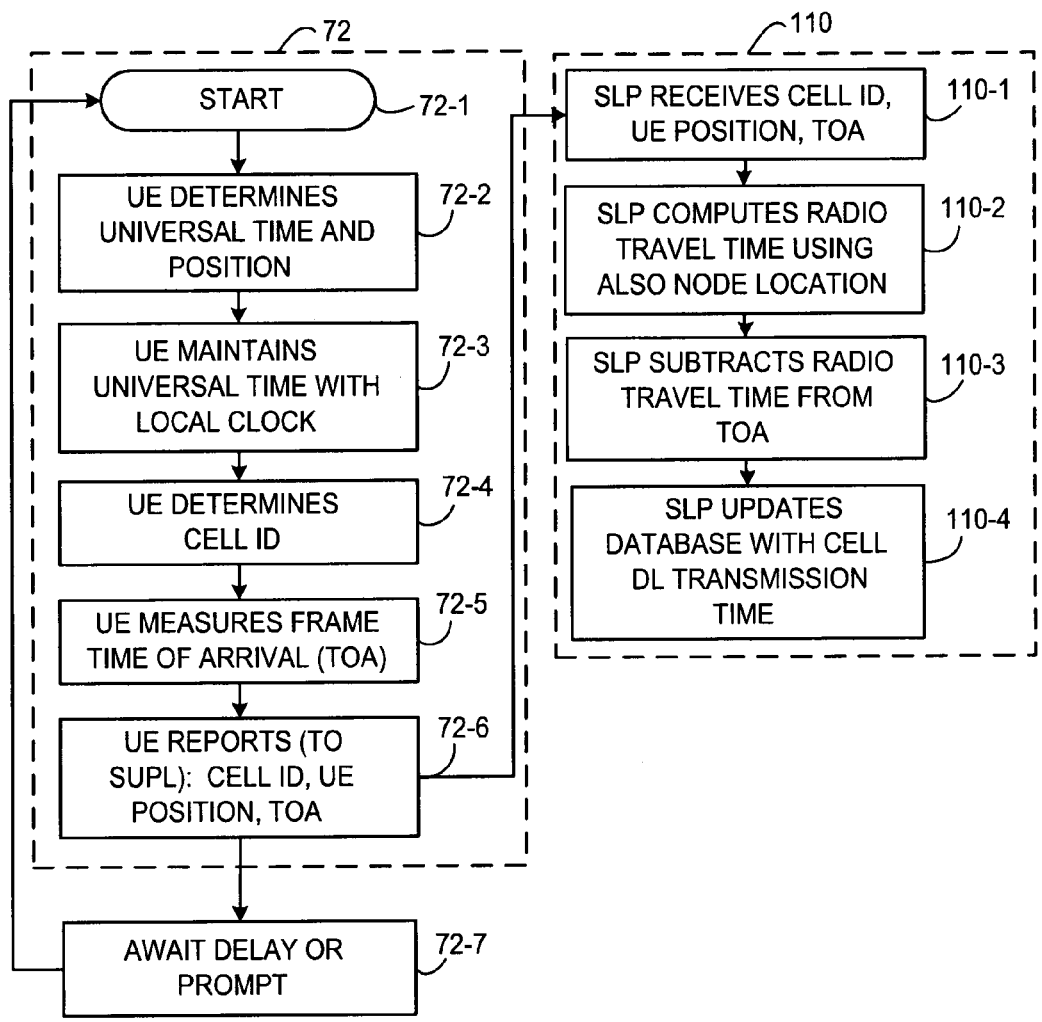
FIG. 11 is a flowchart depicting basic, representative actions performed in conjunction with wireless terminal data base maintenance logic and server data base maintenance logic in conjunction with an example, non-limiting second mode wireless terminal.

In one example implementation of this second mode illustrated in FIG. 11, in conjunction with execution of its data base maintenance logic 72 the wireless terminal simply makes its "location certain TOA report" to SUPL location provider (SLP) server 40. It will be recalled that the location certain TOA report of act 72-6 includes the cell ID (as stored in cell ID register 78), the UE position (as stored in wireless terminal location register 82), and the time of arrival (TOA) as determined at act 72-5 and stored in time of arrival register 80.

Thereafter, as indicated by act 72-7, the wireless terminal awaits a delay or prompt (e.g., interrupt or signal) for a further execution of data base maintenance logic 72 (for a further location certain TOA report). Thus, periodically or when otherwise prompted, the second mode wireless terminal executes acts of data base maintenance logic 72, those acts having been previously described in more detail in conjunction with FIG. 10. In some repeated instances of execution not all acts of data base maintenance logic 72 need necessarily be performed. As such, a second mode wireless terminal need not necessarily include positioning measurement logic 74. Thus, the acts of FIG. 11 may be performed by any wireless terminal 30 that is SUPL-capable and has access to universal references (e.g., A-GPS accessible), without a need to proceed to positioning measurement logic 74.

Upon receipt of the location certain TOA report of act 72-6, in conjunction with a second mode wireless terminal the server 40 executes data base maintenance logic 110. The data base maintenance logic 110 and its constituent acts have been previously described with reference to the first mode of FIG. 10. Upon receipt of the location certain TOA report of act 72-6 from a second mode terminal, the server 40 knows the relatively precise location of the second mode wireless terminal (the location having been carried as an information element in the location certain TOA report of act 72-6). Yet the server 40 benefits from receipt of the location certain TOA report of act 72-6 for other reasons, such as (for example) being able to use the time of arrival (TOA) information element of the location certain TOA report for building/updating its terminal database 104. Updating of the database 104 may not be necessary for ascertaining the location of a second mode wireless terminal, but can be of benefit for ascertaining the location of a hybrid wireless terminal in the same cell (a wireless terminal that does not always have access to or consistently consult the universal reference for terminal location purposes). In this regard, and as explained before), the measured time of transmission is identical for all terminals of the cell, so that measurements from plural terminals including a second mode terminal can be jointly processed (e.g., using a Kalman filter) to obtain a more accurate time of transmission than would otherwise be possible if an individual wireless terminal in the cell were considered in isolation.

6.3 Third Mode: Selective Hybrid Mode

A third mode, also known as the Selective Hybrid mode, resembles the second mode (Consistent Accuracy Mode) in that the wireless terminal 30 has the potential of consistently using and/or providing some or all of the universal information to server 40 so that the server 40 does not have to rely upon estimates. However, unlike a second mode wireless terminal, a third mode wireless terminal also has the capability of selectively functioning in a hybrid mode if necessary. For example, if requested to do so or if the third mode wireless terminal temporarily loses access to or connection with a universal reference source (e.g., a GPS satellite, for example), the third mode wireless terminal can execute packet transmission routine 74 in addition to data base maintenance logic 72.

Figure 12:
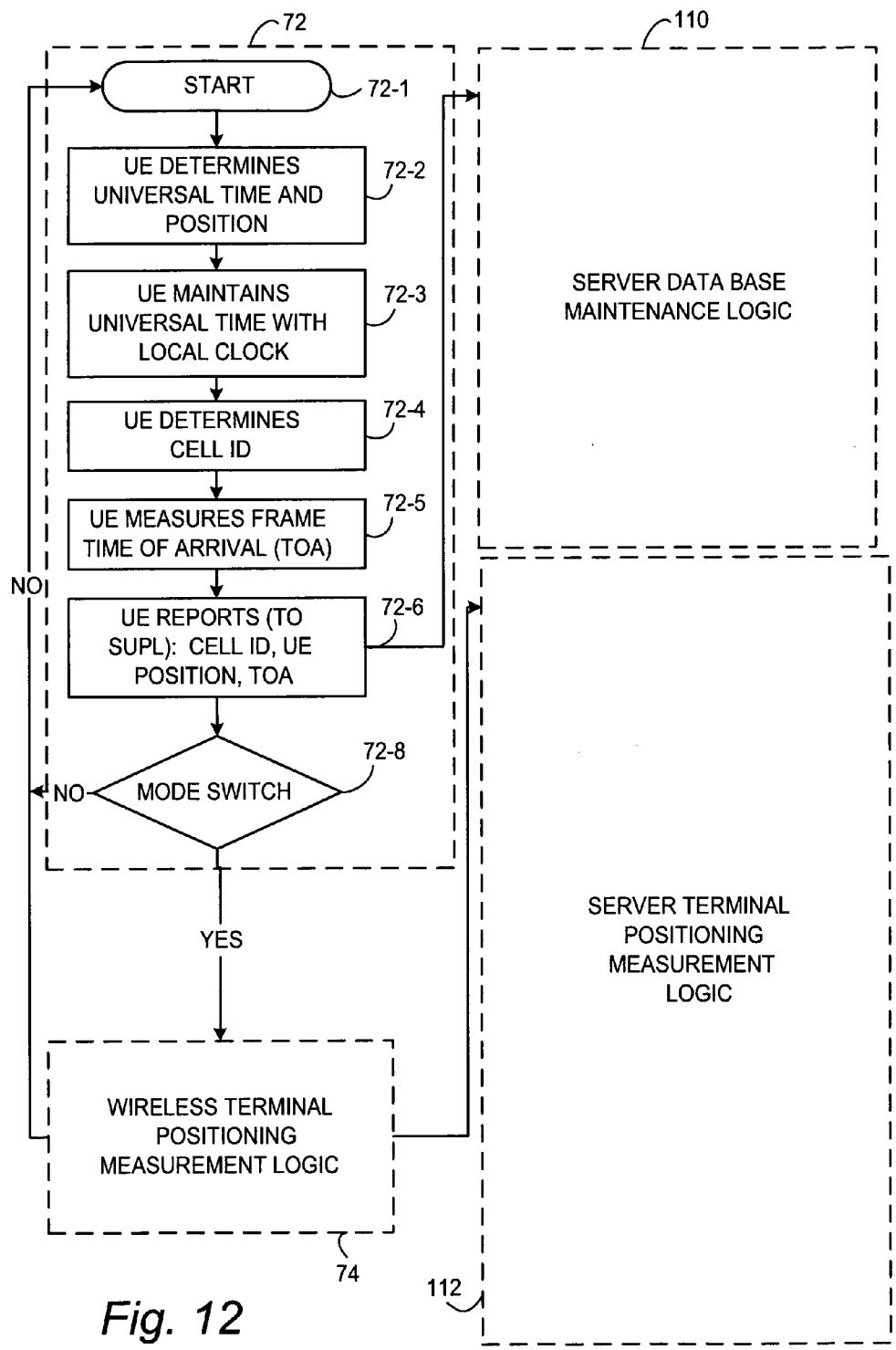
FIG. 12 is a flowchart depicting basic, representative actions performed in conjunction with wireless terminal data base maintenance logic, wireless terminal positioning measurement logic, server data base maintenance logic, and server terminal positioning measurement logic in accordance with an example, non-limiting third mode wireless terminal

FIG. 12 illustrates basic acts (e.g., actions performed, steps implemented, or events occurring) in conjunction with a terminal positioning procedure according to the third example mode (Selective Hybrid mode) of the present technology. The acts of FIG. 12 are generally the same as those of FIG. 10, including the acts of wireless terminal data base maintenance logic 72, the acts of wireless terminal positioning measurement logic 74, the acts of server data base maintenance logic 110, and the acts of server terminal positioning measurement logic 112. For sake of convenience, only the acts of wireless terminal data base maintenance logic 72 are shown in detail in FIG. 12, it being understood that the acts of wireless terminal positioning measurement logic 74, server data base maintenance logic 110, and server terminal positioning measurement logic 112 are essentially the same as those shown in FIG. 10 (for which reason these logic routines are shown merely as blocks in FIG. 12.

The third mode does differ from the first mode and second mode by inclusion of an act such as act 72-8 which checks whether a mode switch as been requested or become necessary. If it is determined at act 72-8 that a mode switch is necessary, the third mode wireless terminal ceases acting like a second mode wireless terminal and instead begins to act as a first mode wireless terminal. In this regard, if it is determined at act 72-8 that a mode switch is necessary, the wireless terminal begins to execute its wireless terminal positioning measurement logic 74. Execution of wireless terminal positioning measurement logic 74 enables server 40 to make cell DL transmission time determinations and to execute server terminal positioning measurement logic 112. A mode switch can be requested or become necessary in various ways. For example, the server 40 may simply request that the wireless terminal make a mode switch. Alternatively, a mode switch may occur with the wireless terminal 30 detects that it cannot rely on its universal reference acquisition unit 90 (e.g., a satellite navigation system) to obtain universal time or location of the terminal, and therefore is unable to express the time of arrival in a "universal time". Such can occur, for example, when the wireless terminal 30 travels into a tunnel or ravine, or other location in which the universal reference acquisition unit 90 may not be operative or communicative with the universal reference system.

Reversion of a third mode wireless terminal from a first mode of operation to a second mode of operation can occur at a further (e.g., subsequent) execution of act 72-8. For example, at a subsequent execution of act 72-8 the wireless terminal may determine that its universal reference acquisition unit 90 is again operative or communicative. Alternatively, by the time of a subsequent execution of act 72-8 the wireless terminal may have received a further directive or signal from an entity such as server 40, requesting return to the second mode of operation.

7.0 Example Aspects of Technology

The technology thus comprises a single travel time (STT) positioning method which can be utilized with a technology such as Secure User Plane Location (SUPL). The technology encompasses numerous aspects, example aspects being listed in non-limiting fashion below:

1. A time of arrival (TOA) measurement, residing in wireless terminal 30 and using support from universal reference acquisition unit 90 (e.g., a satellite navigation system) to express the time of arrival in a "universal time" that may also be known in SUPL location provider (SLP) server 40. Typically the universal reference acquisition unit 90 comprises of an A-GPS receiver in wireless terminal 30. In an illustrated example embodiment, the universal time can be GPS time, for example.

2. Extended SUPL interfaces are provided to allow for ordering of a time of arrival measurement in wireless terminal 30. The ordering of the time of arrival (TOA) measurement can be instituted, e.g., by reporter requester 118 of SUPL location provider (SLP) server 40. These extended SUPL interfaces can carry the extended signaling depicted by new information elements 44 (see FIG. 15C and FIG. 15D).

3. Extended SUPL interfaces are provided to allow for reporting of measured time of arrival (TOA) from wireless terminal 30 to SUPL location provider (SLP) server 40. In an illustrated embodiment, these TOA measurements are reported by reporter 86 and received by UE ID field 120 of SUPL location provider (SLP) server 40. These extended SUPL interfaces also can carry the extended signaling depicted by new information elements 44 (see FIG. 15C and FIG. 15D).

4. Estimation algorithm(s), such as terminal positioning measurement logic 112, of SUPL location provider (SLP) server 40. The estimation algorithm(s) allow for estimation of the downlink time of transmission $t_{DLtransmit}^{CID}(k)$ for each cell of all radio base stations (RBS) 28 of the radio access network (RAN), that are served by SUPL location provider (SLP) server 40. As indicated previously, several SLPs may be needed or used in the RAN. In making the estimation, the terminal position finder 42 of SUPL location provider (SLP) server 40 uses: (1) the cell ID of the serving cell of wireless terminal 30, together with the geographical location of all RBSs; (2) known positions of terminals of opportunity (obtained from high precision position measurements); and (3) time of arrival (TOA) measurements associated with said high precision position measurements, and performed close in time by the same terminal as said high precision position measurements. As used herein, a "terminal of opportunity" is a wireless terminal which, when performing an activity such as an A-GPS measurement, can also be used to accomplish also another or secondary task (e.g., to also perform the measurement of time of arrival and cell ID, so as produce also a 72-6 report).

5. A single trip time (STT) method that exploits the estimated downlink time of transmissions for compensation of the measured and reported time of arrival of a terminal that resides in the cell of the estimated downlink time of transmission.

Yet other optional aspects of the technology include the following non-limiting examples:

6. Extended SUPL interfaces for ordering of joint terminal measurements of time of arrival, cell ID and other information such as at least one of the following examples: measured GPS position or pseudo ranges; measured A-GPS position or pseudo ranges; measured Galileo position or pseudo ranges; measured A-Galileo position or pseudo ranges; measured Assisted Global Navigation Satellite System (A-GNSS) position or pseudo ranges; measured OTDOA-IPDL position or time of arrivals; measured E-OTD position or time of arrivals.

7. Terminal measurement procedures that allow for a simultaneous terminal measurement and joint reporting of time of arrival, cell ID and other information such as at least one of the following: measured GPS position or pseudo ranges; measured A-GPS position or pseudo ranges; measured Galileo position or pseudo ranges; measured A-Galileo position or pseudo ranges; measured A-GNSS position or pseudo ranges; measured OTDOA-IPDL position or time of arrivals; measured E-OTD position or time of arrivals.

8.0 Informational Aspects of Technology 8.1 Information Needed by Server 8.1.1 Information Needed by Server for Positioning Procedure In order to compute an ellipsoid arc, using the estimated single trip time in the SLP corresponding to a time of arrival measurement received from wireless terminal 30, the following information should be available in the SLP (e.g., in SUPL location provider (SLP) server 40):

1. The cell ID of the cell in which wireless terminal 30 is located. This information is obtained from wireless terminal 30 in the form of a cell ID reported over the SUPL interface. The information is required in order to retrieve the estimated (in the SLP) downlink time of transmission ($t_{DLtransmit}^{CID}(k)$) for the correct cell from the database 104 of estimated downlink time of transmissions. The cell ID can be obtained from signaling such as that shown in FIG. 15C and FIG. 15D.

2. The downlink time of transmission ($t_{DLtransmit}^{CID}(k)$) from radio base station (RBS) 28. This information needs to be estimated in the SLP by methods described above. No information from the RAN is used in this step. Rather, the information is derived from terminal measurements (see FIG. 15C and FIG. 15D).

3. The time of arrival (TOA) as measured by the located wireless terminal 30, time stamped with "universal (satellite system) time" and reported from wireless terminal 30 to SUPL location provider (SLP) server 40 over the extended SUPL interface (see FIG. 15C and FIG. 15D).

4. The coordinates of the antenna of radio base station (RBS) 28, for each cell of the system. This information needs to be configured in SUPL location provider (SLP) server 40, e.g., in cell database 106 in an example embodiment).

Figure 3:
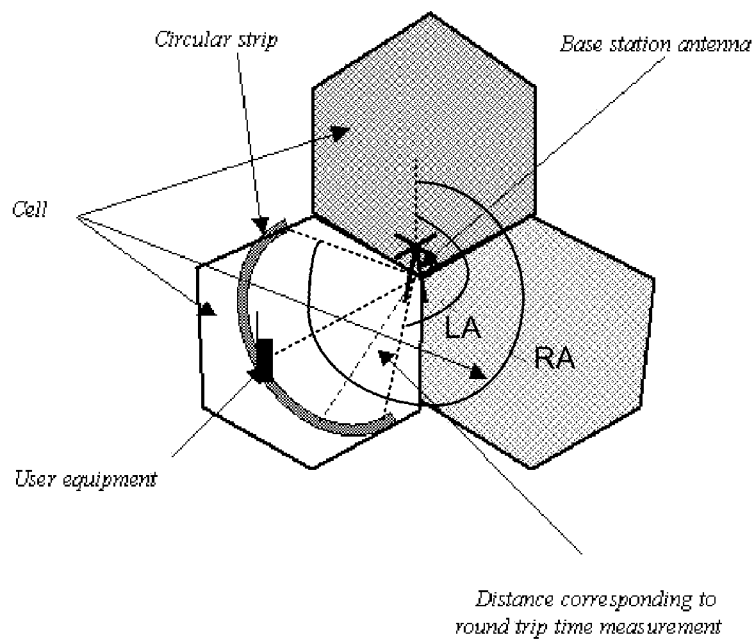
FIG. 3 is a diagrammatic view illustrating cell identity positioning combined with round trip time, and further showing round trip time measurement with respect to a radio base station and a wireless terminal.
Figure 4:
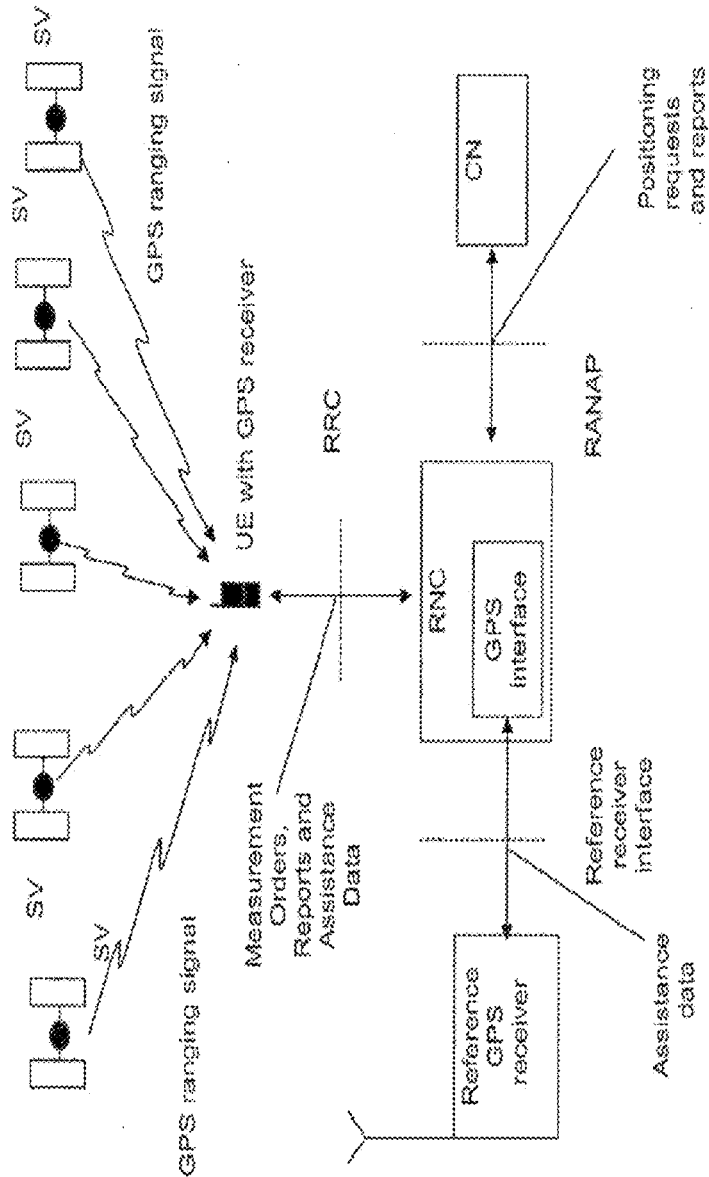
FIG. 4 is a schematic view of an example of A-GPS implemented in a cellular communication system.

5. As an optional enhancement to the performance of the SUPL single trip time positioning method described herein, it may also be advantageous for the SUPL location provider (SLP) server 40 to have cell data in the form of cell polygons. FIG. 9 shows polygon data field 138 suited for this purpose. Having cell data in the form of cell polygons allows the SUPL location provider (SLP) server 40 also to compute left and right angles of the arc where the terminal is located. The concept of left and right angles of the arc is understood with reference to FIG. 3, which shows how a right angle (RA) can be determined (at a first intersection of the arc and the polygon perimeter) and how a left angle (LA) can be determined (at a second intersection of the arc and the polygon perimeter). As mentioned previously, in the WCDMA system the reported position is given by the left angle (LA) and the difference between the right angle and the left angle (RA-LA)

8.1.2 Data Collection and Estimation Procedure by Server

In order to continuously estimate the downlink time of transmission for each cell of each radio base station (RBS) 28 in the system, the following information should be available in the SLP:

1. Measurements that are associated with one particular terminal at one specified time, these associated measurements containing at least (a) the cell ID, so that the measurements are associated with the correct cell and so that the coordinates of the antenna of the radio base station (RBS) 28 of the cell can be made available; (b) the time of arrival measurement of wireless terminal 30 (expressed in "universal time"); and (c) one high precision position measurement, thereby associating an accurate position to the terminal at the approximate time the time of arrival measurement was taken. Preferably, GPS or A-GPS, Galileo, A-Galileo or Assisted Global Navigation Satellite System (A-GNSS) measurements are used, however also E-OTD and OTDOA-IPDL position measurements are possible to use. In case of terminal assisted positioning, the position may be computed in the SLP.

2. The position of the antenna of radio base station (RBS) 28 corresponding to the measured cell ID.

8.2 Measurement and Computation Principle(s)

Figure 14:
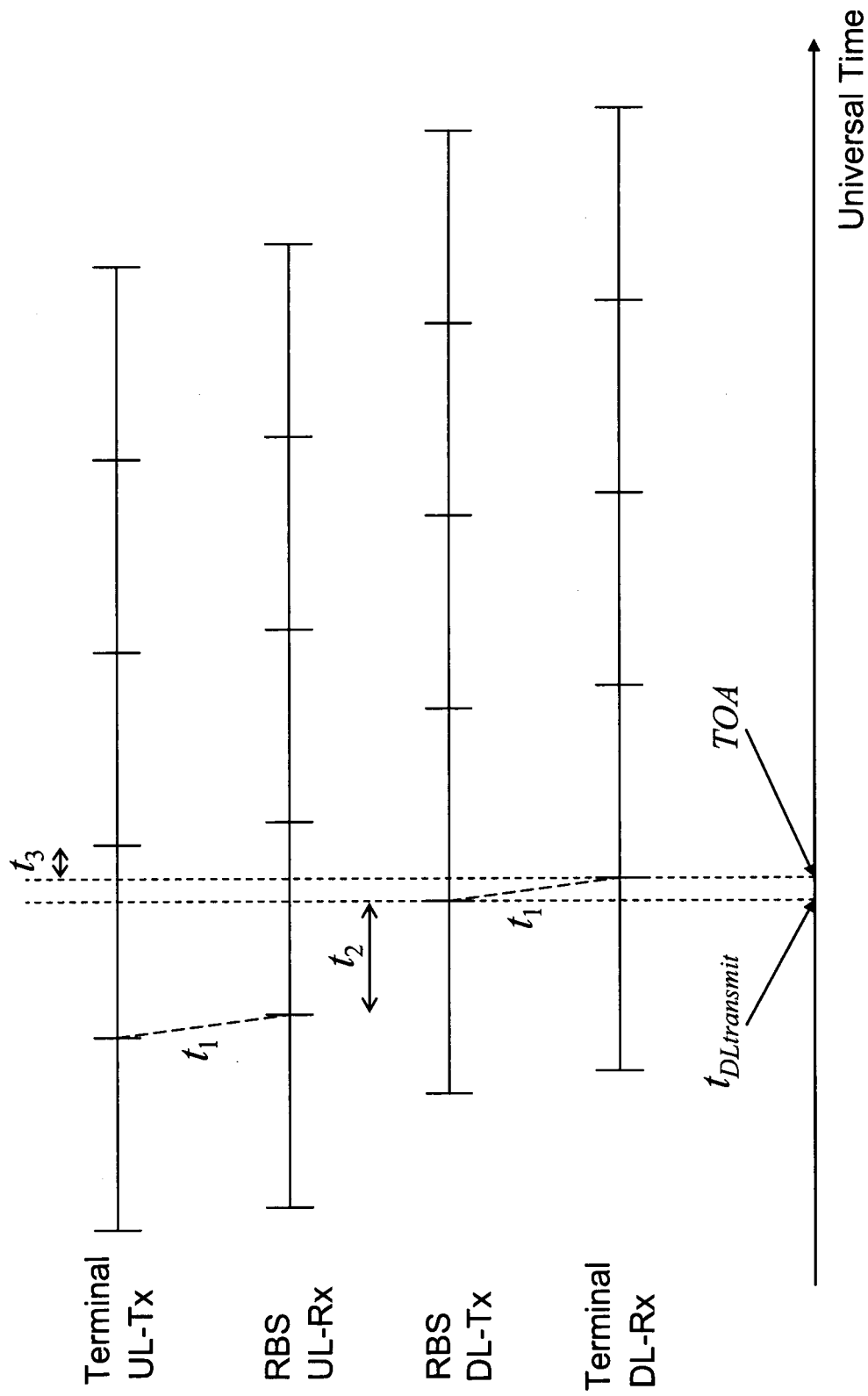
FIG. 14 is a diagrammatic view showing example momentary frame alignments of the uplink (UL) and the downlink (DL) at a time of reception and transmission in a terminal and in an radio base station.

FIG. 14 displays example momentary frame alignments of the uplink (UL) and the downlink (DL) at the time of reception and transmission in the terminal and the RBS, and facilitates an understanding of computation of the downlink time of transmission of the radio base station (RBS) 28.

As can be seen FIG. 14, a sequence starts with the transmission of a new uplink frame from the terminal. After a time $t_1$ the radio waves has traveled to the RBS antenna. This time, multiplied by the speed of light is the sought distance of the complete positioning procedure. This travel time is not directly measurable though, since the transmission of the next (a frame counter is available for tagging of frames) downlink frame from the RBS is not necessarily aligned with the reception of the UL frame. There is a time bias $t_2$ between these two events. When the DL frame is transmitted, at $t_{DLtransmit}$, the travel time back to the terminal is again given by the time $t_1$ and the cycle is completed. Hence, Equation 2:

$$TOA_{Terminal}^{CID}(k) = t_1^{CID}(k) + t_{DLtransmit}^{CID}(k) + e_{TOA}^{CID}(k) \qquad \text{Equation 2}$$

In Equation 2, $TOA_{terminal}^{CID}$ denotes the time of arrival measurement value and $e_{TOA}^{CID}(k)$ is the measurement error. The superscript refers to the ID of the cell and k denotes a running index. Normally the measurement error is assumed to be zero mean white Gaussian noise with covariance depicted in Equation 3 (wherein E[ ] denotes expectation).

$$R_{2,TOA}^{CID} = E[e_{TOA}^{CID}(k)]^2 \qquad \text{Equation 3}$$

There is a similar time bias $t_3$ in the terminal before a new cycle starts. This time bias is measured by the so called UE RxTx type 1 measurement in WCDMA.

The problem is hence that even if the time of arrival measurement is performed in the terminal, the unknown RBS bias $t_{DLtransmit}^{CID}(k)$ destroys the measurement.

Figure 13:
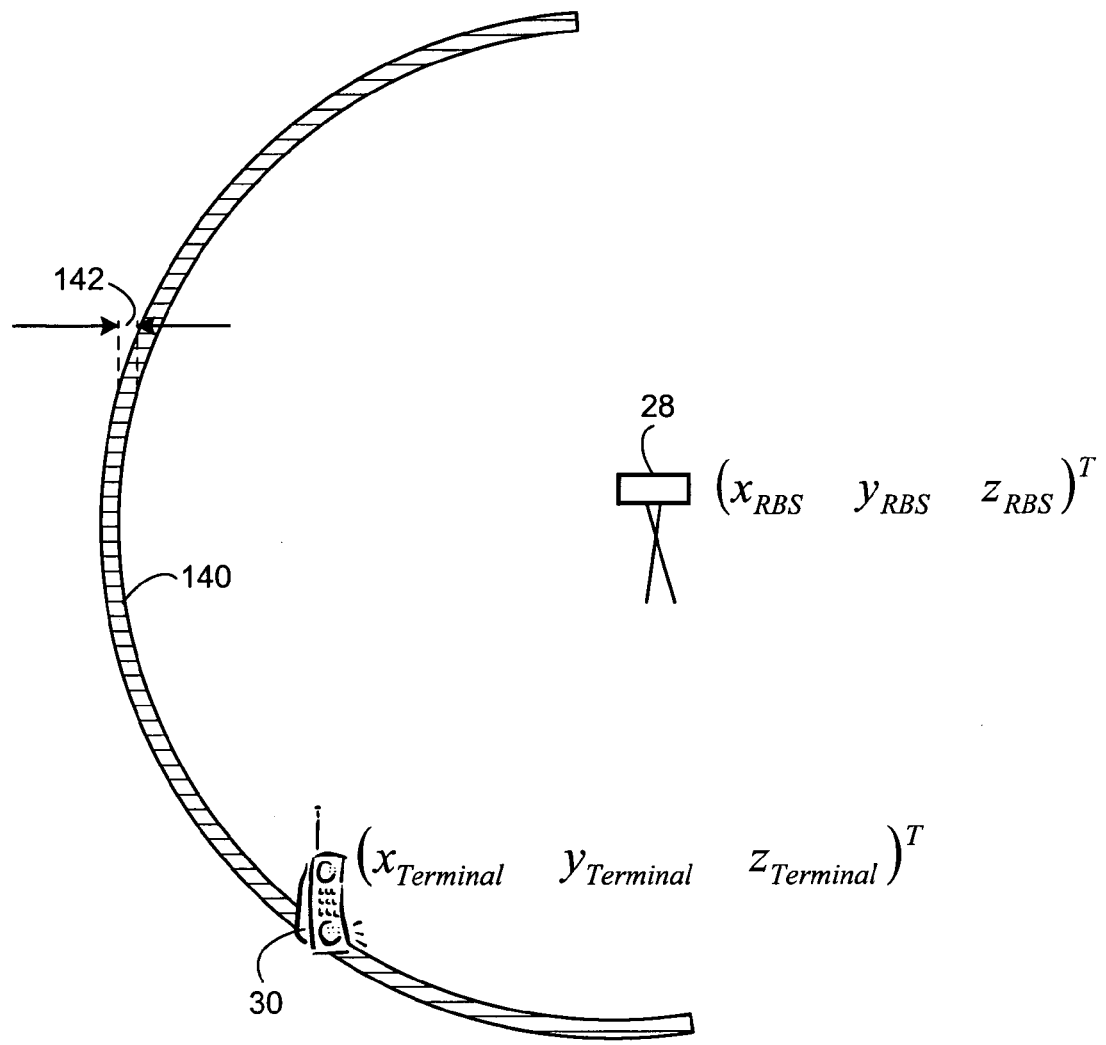
FIG. 13 is a diagrammatic view depicting geometry used for estimation of the time bias, for one specific cell.

The technology allows for computation of $t_{DLtransmit}^{CID}(k)$. This is achieved by performing an additional high precision position measurement at the same time as the time of arrival measurement, and by reporting also of this measurement together with the cell ID to the SLP over the SUPL interface. This follows by consideration of FIG. 13. FIG. 13 depicts geometry used for estimation of the time bias, for one specific cell. It will be understood from FIG. 13 that a two-dimensional case can also be handled, by neglecting the z-coordinate It is immediately clear that with the additional high precision positioning information available, the SUPL location provider (SLP) server can compute Equation 4.

$$t_{1,posComputed}^{CID}(k) = E[t_{1,posComputed}^{CID}(k)] + \frac{1}{c} e_{pos}^{CID}(k) = \frac{1}{c}\sqrt{(x_{RBS}^{CID}(k) - x_{terminal}^{CID}(k))^2 + (y_{RBS}^{CID}(k) - y_{terminal}^{CID}(k))^2 + (z_{RBS}^{CID}(k) - z_{terminal}^{CID}(k))^2} + \frac{1}{c} e_{pos}^{CID}(k) \qquad \text{Equation 4}$$

In Equation 4, c denotes the speed of light and where $e_{pos}^{CID}(k)$ denotes the impact of the positioning measurement error of the high precision position, on the time measurement.

The square root expression of Equation 4 contains the true values (unknown), assuming that the additive measurement error has been obtained by linearization. This linearized error can be computed noting that the dominating measurement error of (3) arises from the measurement of the terminal position. A differentiation leads to Equation 5.

$$e_{pos}^{CID}(k) \approx \frac{1}{c\sqrt{(x_{RBS}^{CID}(k) - x_{terminal}^{CID}(k))^2 + (y_{RBS}^{CID}(k) - y_{terminal}^{CID}(k))^2 + (z_{RBS}^{CID}(k) - z_{terminal}^{CID}(k))^2}}$$

$$= \times (x_{RBS}^{CID}(k) - x_{terminal}^{CID}(k) y_{RBS}^{CID}(k) - y_{terminal}^{CID}(k) z_{RBS}^{CID}(k) - z_{terminal}^{CID}(k)) \begin{pmatrix} \Delta x_{pos}^{CID}(k) \\ \Delta y_{pos}^{CID}(k) \\ \Delta z_{pos}^{CID}(k) \end{pmatrix}$$

$$\approx \frac{1}{c^2 E[t_{1,posComputed}^{CID}](k)} \times$$

$$(x_{RBS}^{CID}(k) - x_{terminal}^{CID}(k) y_{RBS}^{CID}(k) - y_{terminal}^{CID}(k) z_{RBS}^{CID}(k) - z_{terminal}^{CID}(k)) \begin{pmatrix} \Delta x_{pos}^{CID}(k) \\ \Delta y_{pos}^{CID}(k) \\ \Delta z_{pos}^{CID}(k) \end{pmatrix}$$

$$= \frac{1}{c^2 t_{1,posComputed}^{CID}(k)} (r_{Terminal \rightarrow RBS}^{CID}(k))^T e_{pos}^{CID}(k). \qquad \text{Equation 5}$$

In Equation 5, $r_{RBS \to Terminal}^{CID}(k)$ denotes the vector from the terminal to the RBS and $e_{pos}^{CID}(k)$ is the 3D Cartesian positioning measurement vector. Assuming that this measurement error is zero mean, white and Gaussian renders the covariance matrix of Equation 6. In Equation 6, $R_{2,pos}^{CID}$ is the 3D covariance matrix of the positioning measurement error.

$$R_{2,pos}^{CID} = \frac{(r_{Terminal \to RBS}^{CID})^T R_{2,pos}^{CID} r_{Terminal \to RBS}^{CID}}{c^A(t_{1,posComputed}^{CID}(k))^2} \quad \text{Equation 6}$$

Insertion of Equation 4 into Equation 2 results in the transformed measurement of Equation 7:

$$t_{DLtransmit}^{CID}(k) = TOA_{Terminal}^{CID}(k) - \frac{1}{c}\sqrt{(x_{RBS}^{CID}(k) - x_{terminal}^{CID}(k))^2 + (y_{RBS}^{CID}(k) - y_{terminal}^{CID}(k))^2 + (z_{RBS}^{CID}(k) - z_{terminal}^{CID}(k))^2} - e_{TOA}^{CID}(k) - e_{pos}^{CID}(k) \quad \text{Equation 7}$$

Equation 7, together with an assumption of independence between the time of arrival and positioning measurement errors, gives Equation 8. In Equation 8, the quantity $t_{DLtransmit}$ can hence be estimated in the SLP by the disclosed principle. A preferred way of estimation is disclosed below.

$$R_{2,t_{DLtransmit}}^{CID} = R_{2,TOA}^{CID} + R_{2,pos}^{CID} \quad \text{Equation 8}$$

As mentioned above, the two-dimensional case is readily obtained by neglecting the z-coordinate in the above computations.

8.3 Terminal Measurement of Round Trip Time 8.3.1 Measurement

The time of arrival measurement can be performed as specified in the 3GPP WCDMA specifications, valid for the RTT measurement of an radio base station (RBS). This follows since the measurement detects the first finger in the RAKE receiver, with a sufficiently high energy, and since the receiver structures are the same in the RBS and the WCDMA terminals. Complexity restrictions that limit performance in the terminals may be present, a fact that may impact the minimum performance specifications of the time of arrival measurement.

8.4 Signalling Additions 8.4.1 Signaling from Server to Terminal

The technology comprises two types of "orders" from the SLP, e.g., from SUPL location provider (SLP) server 40. The first order is associated with the data collection aiming at estimation of the time of transmission of the cells of the RBSs of the system (see FIG. 15A). Such an "order", initiated e.g., by reporter requester 118, may request one, two, or all quantities defined in section 8.4.2. An alternative would be to implement the "order" by several sequential measurement "orders".

The second type of order is an order for a time of arrival measurement to be performed by the terminal (see FIG. 15B).

These orders can either be added to RRC/RRLP or embedded within the SUPL data interface outside these two interfaces.

The orders may also be initiated also from the wireless terminal, e.g., a terminal may trigger one of the above two orders. A third party may also trigger any of the two above orders.

8.4.2 Signaling from Terminal to Server

Information elements that can carry the measured time of arrival value may be added in the direction from wireless terminal 30 to SUPL location provider (SLP) server 40, as shown in FIG. 15C and FIG. 15D. As discussed above, it is advantageous if at least a cell identity is associated to the reported measurement value. It is even more advantageous (in an optional implementation) if a high precision position can be associated with the reported result. It is even still more advantageous (in an optional implementation) if a timer value can be associated to the reported measured time of arrival value.

8.5 Estimation Principles

The measurement Equations 3, 6, 7, and 8 invite the use of a Kalman filter for continuous recursive estimation of $t_{DLtransmit}^{CID}$ one filter for each cell. Two main cases are considered here: (1) estimation of $t_{DLtransmit}^{CID}$ only, using a random walk model; and (2) joint estimation of $t_{DLtransmit}^{CID}$ and the corresponding drift rate $t_{DLtransmit}^{CID}$ & using an integrated random walk model.

8.5.1 Random Walk Models

A first random walk model is given by Equations 9.

$$x = t_{DLtransmit}^{CID}$$

$$x(k+1) = x(k) + (SFN(k+1) - SFN(k))_{corrected} T_{Frame} + w_{t_{DLtransmit}}^{CID}(k)$$

$$R_1^{1,CID} = E[w_{t_{DLtransmit}}^{1,CID}(k)]^2 \quad \text{Equations 9}$$

Equations 9 show the time at index k. In Equations 9 $(SFN(k+1) - SFN(k))_{corrected}$ is the number of frames, corrected for possible wraparound, that has passed between the measurements corresponding to indices k and k+1. $T_{Frame}$ corresponds to the duration of a downlink frame. Wrap around considerations of maintenance of some types of universal time (such as GPS time) may also need to be taken into consideration.

A second integrated random walk model is reflected by Equations 10.

$$x = \begin{pmatrix} \dot{t}_{DLtransmit}^{CID} \\ t_{DLtransmit}^{CID} \end{pmatrix} \quad \text{Equations 10}$$

$$x(k+1) = \begin{pmatrix} 1 & 0 \\ t(k+1) - t(k) & 1 \end{pmatrix} x(k) + (SNF(k+1) - SFN(k))T_{Frame} + w_{t_{DLtransmit}^i DLtransmit}^{CID}(k)$$

$$R_1^{2,CID} = E\left[\left(w_{t_{DLtransmit}^i DLtransmit}^{CID}(k)\right)\left(w_{t_{DLtransmit}^i DLtransmit}^{CID}(k)\right)^T\right]$$

In Equations 10, t(k) is the time associated with index k. The above quantities are then applied in the Kalman filter, which is given by the matrix and vector iterations of Equations 11:

$$K_f(k) = P(k|k-1)C^T(CP(k|k-1)C^T + R_2)^{-1}$$

$$\hat{x}(k|k) = \hat{x}(k|k-1)$$

$$P(k|k) = P(k|k-1) - K_f(k)C(k)P(k|k-1)$$

$$\hat{x}(k+1|k) = A(k+1)x(k|k) + Bu(k)$$

$$P(k+1|k) = A(k+1)P(k|k)A(k+1)^T + R_1 \quad \text{Equations 11}$$

One filter is needed for each cell. The quantities introduced by the filter iterations (10) are as follows. $u(k) = (SFN(k+1) - SFN(k))_{corrected}$ denotes the input signal. y(k) denotes the measurement (here the computed downlink time of transmission (6)), $\hat{x}(k|k-1)$ denotes the state prediction, based on data up to index k−1, $\hat{x}(k|k)$ denotes the filter update, based on data up to index k, P(k|k−1) denotes the covariance matrix of the state prediction, based on data up to index k−1, and P(k|k) denotes the covariance matrix of the filter update, based on data up to time k. C denotes the measurement matrix, $K_f(k)$ denotes the time variable Kalman gain matrix, $R_2$ denotes the measurement covariance matrix, and $R_1$ denotes the system noise covariance matrix.

The quantities A, B, C, $R_1$ and $R_2$ in Equation 11 follow from Equations 3 and 6-10. For model 1, the quantities A, B, C, $R_1$ and $R_2$ are represented by Equations 12.

$$A(k) = 1$$
$$B = 1$$
$$C = 1$$
$$R_1 = R_1^{1,CID}$$
$$R_2 = R_{2,t_{DLtransmit}} \quad \text{Equations 12}$$

For model 1, the quantities A, B, C, $R_1$ and $R_2$ are represented by Equations 13.

$$A(k) = \begin{pmatrix} 1 & 0 \\ t(k) - t(k-1) & 1 \end{pmatrix}$$

$$B = \begin{pmatrix} 0 \\ 1 \end{pmatrix}$$

$$C = 1$$

$$R_1 = R_1^{2,CID}$$

$$R_2 = R_{2,t_{DLtransmit}}^{CID} \quad \text{Equations 13}$$

9.0 Example Advantages

Technical advantages and benefits of the technology include the following (listed by way of non-limiting examples):

1. An enhanced cell ID positioning method for SUPL with similar performance as the WCDMA RTT positioning method, applicable for terminals capable of accessing a universal time reference (such a satellite navigation capable terminal) and a high precision position. In many markets the penetration of A-GPS is foreseen to become very high, so that the technology may become available to virtually all users.

2. The techniques of the present technology are particularly useful to improve Adaptive Enhanced Cell Identity (AECID) positioning, when AECID positioning is performed over the so-called secure user plane. The reason is that current the secure user plane positioning in WCDMA relies only on less accurate cell ID information and signal strength measurements. The information provided by the present technology is expected to enhance AECID secure user plane positioning accuracy significantly.

3. Enhanced indoor and urban canyon performance for satellite navigation capable terminals. Such enhancement can be provided in various ways such as, for example:

Using the terminals to establish "universal time" regularly. This time reference can be expected valid also some time after establishment. In WCDMA the specification calls for a frequency stability better than 100 ppb. In practice clock performance is much better, perhaps 10 ppb. By using filtering to estimate the clock drift in the terminal, e.g., against A-GPS time fixes, even significantly better performance should be possible. Assuming for reference a 1 ppb value would then correspond to drift times to a (drift) error of 200 meters after more than 10 minutes has passed since the last acquisition of universal reference time.

Using time of arrival (TOA) measurements to replace satellite navigation during dropouts, e.g. indoors or in urban canyons.

Combining TOA measurements with so-called UE-assisted satellite navigations, thereby reducing the number of satellites that need to be detected by at least one. This could be a SUPL counterpart to AFLT positioning.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art. All structural, chemical, and functional equivalents to the elements of the above-described preferred embodiment that are known to those of ordinary skill in the art are encompassed herein. Moreover, it is not necessary for a device or method to address each and every problem sought to be solved by the present invention for it to be encompassed hereby.

What is claimed is:

1. A server which is external to a radio access network, the server comprising:
a signaling interface through which the server is adapted to receive, from a wireless terminal of the radio access network and without invoking any radio access network protocol:
a first report comprising at least two information elements determined at a known universal clock time, the at least two information elements comprising:
a wireless terminal position; and
a location certain time of arrival measurement for a downlink radio frame received by the wireless terminal from a node associated with a cell of a radio access network;
a second report comprising:
a location uncertain time of arrival measurement for a subsequent downlink radio frame received by the wireless terminal;
a timer value indicative of time elapsed since determination of the known universal clock time;

a controller configured to:
estimate an estimated time of transmission of the subsequent downlink radio frame;
determine a current radio travel time as a difference between the estimated time of transmission of the subsequent downlink radio frame and the location uncertain time of arrival measurement of the subsequent downlink radio frame;
estimate a distance between the node and the wireless terminal using the current radio travel time and a geographical position of the node;
use the timer value to estimate a clock drift error of the wireless terminal;
use the distance between the node and the wireless terminal generate an ellipsoid arc for describing a range of possible geographical positions of the wireless terminal and use the timer value generating a thickness dimension of the ellipsoid arc.

2. The server of claim 1, wherein the controller is further adapted to determine the estimated time of downlink transmission using time of arrival measurements received from plural terminals of the cell.

3. The server of claim 1, wherein the universal clock time is maintained external to the radio access network.

4. The server of claim 1, wherein the controller is further configured to generate the ellipsoid arc for describing a single trip time positioning of the wireless terminal.

5. The server of claim 1, wherein the server is a Secure User Plane Location (SUPL) Location Platform (SLP) server and wherein the first report and the second report comprise SUPL signaling.

6. The server of claim 2, further comprising an interface for receiving, for each time of arrival measurement, a corresponding cell identity.

7. The server of claim 2, wherein the controller is further adapted to use a Kalman filter to determine the estimated time of downlink transmission, for a specific cell, by using:
(1) time of arrival measurements received from the plural terminals of the cell;
(2) wireless terminal position measurements from the plural terminals of the cell corresponding in time to said plural time of arrival measurements;
(3) information indicative of position of the node; and
wherein (1) and (2) are received as a pair, each pair corresponding to one wireless terminal.

8. The server of claim 7, wherein said Kalman filter is configured to process a measurement model, for each of the pairs of measurements, said measurement model being dependent on:
received time of arrival measurement of the pair and a corresponding measurement error variance;
received wireless terminal position of the pair and a corresponding measurement error variance; and,
the information indicative of the position of the node.

9. The server of claim 8, wherein said Kalman filter is based on a random walk model.

10. The server of claim 9, wherein said Kalman filter is further based on an integrated random walk model.

11. A method of determining position of a wireless terminal in a radio access network, the method comprising:
generating, at the wireless terminal:
a first report comprising at least two information elements determined at a known universal clock time, the at least two information elements comprising:
a wireless terminal position; and
a location certain time of arrival measurement for a downlink radio frame received by the wireless terminal from a node associated with a cell of a radio access network;
a second report comprising:
a location uncertain time of arrival measurement for a subsequent downlink radio frame received by the wireless terminal;
a timer value indicative of time elapsed since determination of the known universal clock time;
using a controller at a server to:
estimate an estimated time of transmission of the subsequent downlink radio frame;
determine a current radio travel time as a difference between the estimated time of transmission of the subsequent downlink radio frame and the location uncertain time of arrival measurement of the subsequent downlink radio frame;
estimate a distance between the node and the wireless terminal using the current radio travel time and a geographical position of the node;
use the timer value to estimate a clock drift error of the wireless terminal;
use the distance between the node and the wireless terminal to generate an ellipsoid arc for describing the position of the wireless terminal;
use the timer value to generate a thickness dimension of the ellipsoid arc.

12. The method of claim 11, wherein the controller is further adapted to determine the estimated time of downlink transmission using time of arrival measurements received from plural terminals of the cell.

13. The method of claim 11, further comprising maintaining the universal clock time external to the radio access network.

14. The method of claim 11, further comprising using the distance between the wireless terminal and the node to generate the ellipsoid arc for describing a single trip time positioning of the wireless terminal.

15. The method of claim 12, further comprising the plural terminals of the cell each sending plural wireless terminal position measurements to the server, the wireless terminal position measurements corresponding in time to the time of arrival measurements, and using the wireless terminal position measurements for determining the estimated time of downlink transmission.

16. The method of claim 15, further comprising sending a cell identity from the wireless terminal to the server, the cell identity corresponding to the time of arrival measurement.

17. The method of claim 15, further comprising using a Kalman filter to determine the estimated time of downlink transmission, for a specific cell, the Kalman filter using:
(1) time of arrival measurements received from plural wireless terminals;
(2) plural wireless terminal position measurements from the plural terminals of the cell corresponding in time to said plural time of arrival measurements;
(3) information indicative of position of the node; and
wherein (1) and (2) are received as a pair, each pair corresponding to one wireless terminal.

18. The method of claim 17, further comprising using the Kalman filter to process a measurement model, for each of the pairs of measurements, the measurement model being dependent on:
received time of arrival measurement of the pair and a corresponding measurement error variance;

received wireless terminal position of the pair and a corresponding measurement error variance; and, the information indicative of the position of the node.

19. The method of claim 18, wherein said Kalman filter is based on a random walk model.

20. The method of claim 19, wherein said Kalman filter is further based on an integrated random walk model.

21. The method of claim 11, wherein the server is a Secure User Plane Location (SUPL) Location Platform (SLP) server and therein the method further comprises transmitting the first report and the second report using SUPL signaling.

* * * * *

UNITED STATES PATENT AND TRADEMARK OFFICE
CERTIFICATE OF CORRECTION

PATENT NO. : 8,654,010 B2  
APPLICATION NO. : 12/595317  
DATED : February 18, 2014  
INVENTOR(S) : Wigren Page 1 of 2

It is certified that error appears in the above-identified patent and that said Letters Patent is hereby corrected as shown below:

In the Drawings:

In Fig. 9, Sheet 8 of 14, for Tag "102", delete "SULP SIGNAL" and insert -- SUPL SIGNAL --, therefor.

In the Specification:

In Column 1, Line 45, delete "GPS)." and insert -- (GPS). --, therefor.

In Column 6, Line 23, delete "SULP" and insert -- SUPL --, therefor.

In Column 9, Line 12, delete "above)" and insert -- above). --, therefor.

In Column 10, Line 36, delete "is" and insert -- is a --, therefor.

In Column 12, Line 31, delete "base station transceiver (BTS)," and insert -- base transceiver station (BTS), --, therefor.

In Column 21, Line 40, delete "before)," and insert -- before, --, therefor.

In Column 22, Line 12, delete "(for" and insert -- for --, therefor.

In Column 24, Line 44, delete "embodiment)." and insert -- embodiment. --, therefor.

In Column 24, Line 61, delete "(RA-LA)" and insert -- (RA-LA). --, therefor.

In Column 27, Line 2, delete "$e_{pios}^{CID}(k)$" and insert -- $e_{pos}^{CID}(k)$ --, therefor.

Signed and Sealed this  
Thirtieth Day of September, 2014

Michelle K. Lee  
*Deputy Director of the United States Patent and Trademark Office*

CERTIFICATE OF CORRECTION (continued)
U.S. Pat. No. 8,654,010 B2

In Column 29, Line 7, delete "$\hat{x}(k|k) = \hat{x}(k|k-1)$" and insert -- $\hat{x}(k|k) = \hat{x}(k|k-1) + K_f(t)(y(k) - C\hat{x}(k|k-1))$ --, therefor.

In Column 29, Line 39, delete "$R_2 = R_{2,lDL_{transmit}}$" and insert -- $R_2 = R_{2,lDL_{transmit}}^{CID}$ --, therefor.